US012139932B2

(12) United States Patent
Bennett et al.

(10) Patent No.: US 12,139,932 B2
(45) Date of Patent: Nov. 12, 2024

(54) ADJUSTABLE AND CONFIGURABLE BENT DOOR PULL

(71) Applicant: Triangle Brass Manufacturing Co., Inc., Oceanside, CA (US)

(72) Inventors: Jason Bennett, San Marcos, CA (US); Adam Matusz, San Marcos, CA (US)

(73) Assignee: Triangle Brass Manufacturing Co., Inc., Oceanside, CA (US)

( * ) Notice: Subject to any disclaimer, the term of this patent is extended or adjusted under 35 U.S.C. 154(b) by 904 days.

(21) Appl. No.: 16/881,574

(22) Filed: May 22, 2020

(65) Prior Publication Data

US 2021/0363779 A1 Nov. 25, 2021

(51) Int. Cl.
*E05B 1/00* (2006.01)

(52) U.S. Cl.
CPC ....... *E05B 1/0015* (2013.01); *E05Y 2900/132* (2013.01)

(58) Field of Classification Search
CPC .... E05B 1/0015; Y10T 16/548; Y10T 16/459; Y10T 16/513; Y10T 16/498; E05Y 2900/132
See application file for complete search history.

(56) References Cited

U.S. PATENT DOCUMENTS

| | | | | | |
|---|---|---|---|---|---|
| 2,961,694 | A * | 11/1960 | May | F16B 7/048 | 16/412 |
| 3,017,657 | A * | 1/1962 | Mills | E05B 1/0015 | 16/413 |
| 4,912,809 | A * | 4/1990 | Scheuer | F16B 9/054 | 16/413 |
| 6,186,027 | B1 * | 2/2001 | Nielsen | B62K 21/18 | 403/365 |
| 6,463,628 | B1 * | 10/2002 | Yeh | E05B 1/0015 | 16/412 |
| 6,543,089 | B2 * | 4/2003 | Tasman | E05B 1/0015 | 16/412 |
| 6,578,235 | B2 * | 6/2003 | Womack | E05B 1/0015 | 16/412 |

(Continued)

*Primary Examiner* — Victor D Batson
*Assistant Examiner* — Matthew J Sullivan
(74) *Attorney, Agent, or Firm* — The lwashko Law Firm, PLLC; Lev Ivan Gabriel Iwashko

(57) ABSTRACT

An adjustable bent door pull to be installed on a first surface of a door, the adjustable door pull including a bent grip to facilitate gripping thereof, the bent grip including a main portion, and a bent portion angularly disposed on at least a portion of the main portion to extend away from the main portion with respect to a lateral direction, and at least one detachable standoff removably connected to the bent grip to allow the bent grip to be attached to the first surface of the door, the at least one detachable standoff including an attachment portion comprising an aperture to receive the bent grip therein, a clamp portion disposed on a first end of the attachment portion to control movement of the bent grip through the aperture, an offset portion disposed on a second end of the attachment portion to extend away from the attachment portion in a first direction, and a protruding portion to extend away from the offset portion in a second direction different from the first direction to connect to the first surface of the door.

14 Claims, 14 Drawing Sheets

(56) References Cited

U.S. PATENT DOCUMENTS

| | | | | |
|---|---|---|---|---|
| 6,966,101 | B2 * | 11/2005 | Chiang | E05B 1/0015 16/412 |
| 7,219,394 | B2 * | 5/2007 | Wu | E05B 1/0015 16/412 |
| 7,263,744 | B2 * | 9/2007 | Kim | E05B 1/0015 16/412 |
| 7,357,467 | B2 * | 4/2008 | Lee | A47B 95/02 16/422 |
| 7,640,630 | B2 * | 1/2010 | Lee | F25D 23/028 16/413 |
| 7,665,810 | B2 * | 2/2010 | Crompton | F25D 23/10 312/204 |
| 8,523,126 | B2 * | 9/2013 | Garrels | A47K 17/022 248/222.14 |
| 9,862,450 | B2 * | 1/2018 | Meggiolan | B62K 21/12 |
| 9,909,338 | B1 * | 3/2018 | Abrahams | E05B 1/0015 |
| 9,945,151 | B2 * | 4/2018 | Giacomini | F25D 23/028 |
| 10,370,056 | B2 * | 8/2019 | Komatsu | B60T 7/10 |
| 10,583,889 | B1 * | 3/2020 | Sanchez | B62K 21/125 |
| 10,808,741 | B2 * | 10/2020 | Ahnert | B25B 5/08 |
| 2012/0085205 | A1 * | 4/2012 | Quick | A01D 34/824 81/489 |
| 2016/0084567 | A1 * | 3/2016 | Fernandez | E05B 1/0015 312/405 |
| 2018/0340348 | A1 * | 11/2018 | Simon | E05B 3/04 |

* cited by examiner

ADJUSTABLE AND CONFIGURABLE BENT DOOR PULL

CROSS-REFERENCE TO RELATED APPLICATIONS

This application is a continuation in part of, and therefore, incorporates by reference, U.S. nonprovisional patent application Ser. No. 15/444,167, entitled "Adjustable and Configurable Door Pull and Installation Method Thereof," which was filed on Feb. 27, 2017.

BACKGROUND

1. Field

The present general inventive concept relates to improvements to a conventional door pull, and more particularly, to an adjustable and configurable bent door pull.

2. Description of the Related Art

Shopping malls, office-buildings, businesses, hospitals, gymnasiums, universities, schools, and other non-residential, and even residential-type edifices, often include doors that are designed to require door pulls as door-opening mechanisms. A conventional door pull may be installed either on both sides of a door, or on one side of a door with a different alternative door-opening mechanism on the other side of the door, such as a push plate, door handle, or touch bar.

The conventional door pull typically includes one, two, or three permanently fixed standoffs, which allow the door pull to be installed away from the door at a predetermined distance, thereby allowing a user to wrap a hand around the door pull and duly comply with industry standards and/or requirements of various regulations such as the Americans with Disabilities Act (ADA).

Oftentimes, door manufacturers are different from door pull manufacturers, for at least the reason that a consumer, customer, or user may desire to purchase the door from one manufacturer, and the door pull from a different manufacturer. As such, when constructing a building, for example, the consumer typically places an order with a first manufacturer for a certain number of doors, and includes specifications for the doors to include pre-drilled holes to allow door pulls, which are ordered from a second manufacturer, to be installed on the doors.

However, due to specification imperfections, misread specifications, mis-measured drillings, and other types of human-error, the doors are often delivered to the consumer with the pre-drilled holes improperly spaced apart. As a result, the conventional door pulls cannot be installed on the doors because center-to-center distances between the permanently fixed standoffs do not properly correspond to the pre-drilled holes of the doors, and therefore, either the doors or the door pulls must be reordered. Consequently, time and money are both wasted during the process of reordering properly predrilled doors or re-configured door pulls. Moreover, even if the doors are delivered without pre-drilled holes, thereby requiring the consumer to drill the holes himself/herself, the consumer must be careful to drill the holes to be spaced-apart perfectly, to allow the door pulls to be installed on the doors.

In addition, if the doors are delivered with a pre-drilled cylinder hole for installation of a door lock, then door pulls with offset standoffs may be required to allow the consumer to access the door lock. As such, if the door pulls are ordered and delivered without offset standoffs, then the door pulls must be reordered, thereby wasting time and money.

Also, an office manager may desire to decorate an office with a certain theme during various parts of the year, such as during holidays, for example. Therefore, in October, the office manager may decorate the office in orange and black, to correspond to Halloween-type decorations and colorings. As another example, the office manager may want to decorate the office in red and pink for Valentine's day in February. However, conventional door pulls are typically provided in one color, and cannot be customized after installation.

Additionally, a consumer may want to permanently include a particular design, logo, or word on a door pull, push plate, door handle, or touch bar. However, manufacturers of door pulls, push plates, door handles, and touch bars do not offer such customized features on their hardware.

Furthermore, it is often preferable to maintain a sanitary environment in various buildings, such as hospitals, schools, and universities. Hospital Acquired Infections (HAI) number over 103,000 cases per year nationally. Combined with home and school acquired infections the total rises to over 2 million every year causing lost work days and absenteeism. The cost of treatment of those occurrences is estimated between $35 and $45 billion dollars annually and is rising. However, conventional door pulls are not designed to reduce an amount of bacteria that is inadvertently transferred to the conventional door pulls from hands of various different users.

More specifically, the global community is gravely affected by a coronavirus pandemic. A novel pathogen that has been identified as severe acute respiratory syndrome coronavirus 2 (SARS-CoV-2) causes a disease named coronavirus disease 2019 (COVID-19). Due to the coronavirus pandemic, it is even more important to avoid using door pulls that require using hands for opening doors.

Therefore, there is a need for door pulls that allow a consumer to easily adjust standoffs based on the consumer's preferences and/or requirements.

Also, there is a need for door pulls and other hardware that allow the consumer to change and/or customize an appearance thereof.

Finally, there is a need for door pulls and other hardware that reduce an amount of bacteria on surfaces thereof.

SUMMARY

The present general inventive concept provides an adjustable and configurable door pull, and an installation method thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an adjustable door pull to be installed on a first surface of a door, the adjustable door pull including a grip, and at least one detachable standoff removably coupled to the grip to allow the grip to be attached to the first surface of the door.

The at least one detachable standoff may include an attachment portion having an aperture into which the grip is inserted, and a protruding portion to extend from the attachment portion at a first end thereof, such that a second end opposite with respect to the first end contacts and attaches to the first surface of the door.

The protruding portion may include an aperture to allow the attachment portion to be coupled to the grip, and a screw to be inserted fully into the aperture of the protruding portion until the screw also inserts at least partially into the aperture of the attachment portion to couple the attachment portion to the grip.

The adjustable door pull may further include a through bolt to be inserted through a hole from a second surface of the door, the through bolt comprising a threaded portion to screw into the aperture of the protruding portion to fix the protruding portion to the first surface of the door.

The adjustable door pull may further include a shoulder bolt, including comprising a first end to screw into the aperture of the protruding portion, and a second end to be inserted into another aperture of another protruding portion of another at least one detachable standoff of another adjustable door pull.

The adjustable door pull may further include at least one auxiliary set screw to be screwed into at least one auxiliary set screw hole of the another protruding portion of the another at least one detachable standoff to secure the shoulder bolt to the another adjustable door pull.

The at least one detachable standoff may include an attachment portion having an aperture into which the grip is inserted, and a protruding portion, including an offset portion to extend away from the grip in a first direction, and an attaching leg portion to extend from the offset portion in a second direction different from the first direction to attach the protruding portion to the first surface of the door.

The attachment portion may include an set screw hole into which a set screw may be inserted to fix the attachment portion of the at least one detachable standoff to the grip.

The adjustable door pull may further include at least one removable end cap disposed at least one end of the grip.

At least one of the grip and the at least one detachable standoff may include a copper alloy.

The foregoing and/or other features and utilities of the present general inventive concept may also be achieved by providing a method of installing an adjustable door pull onto a first surface of a door, the method including sliding a first end of a grip into an aperture of a first detachable standoff to correspond to a first hole at the first surface of the door, sliding a second end of the grip into an aperture of a second detachable standoff to correspond to a second hole at the first surface of the door, securing the first detachable standoff and the second detachable standoff to the grip, inserting a first through-bolt through the first hole at a second surface of the door, screwing in the first through-bolt into the first set screw hole at to secure the first detachable standoff to the door, inserting a second through-bolt through the second hole at the second side of the door, and screwing in the second through-bolt into the second set screw hole to secure the second detachable standoff to the door.

The securing of the first detachable standoff and the second detachable standoff to the grip may include inserting a first set screw into a first set screw hole of the first detachable standoff, and inserting a second set screw into a second set screw hole of the second detachable standoff.

The foregoing and/or other features and utilities of the present general inventive concept may also be achieved by providing a method of installing two adjustable pulls onto a door, the method including sliding a first end of a first grip into an aperture of a first detachable standoff to correspond to a first hole at a first side of a door, sliding a second end of the first grip into an aperture of a second detachable standoff to correspond to a second hole at the first side of the door, securing the first detachable standoff and the second detachable standoff to the first grip, respectively, sliding a first end of a second grip into an aperture of a third detachable standoff to correspond to the first hole at the first side of the door, sliding a second end of the second grip into an aperture of a fourth detachable standoff to correspond to the second hole at the first side of the door, securing the third detachable standoff and the fourth detachable standoff to the second grip, respectively, screwing a first shoulder bolt into the first set screw hole of the first detachable standoff, screwing a second shoulder bolt into the second set screw hole of the second detachable standoff, inserting the first shoulder bolt through the first hole at the first side of the door while simultaneously inserting the second shoulder bolt through the second hole at the first side of the door, inserting the first shoulder bolt into the third set screw hole of the third detachable standoff, while simultaneously inserting the second shoulder bolt into the fourth set screw hole of the fourth detachable standoff, securing the third detachable standoff to the first shoulder bolt, and securing the fourth detachable standoff to the second shoulder bolt.

Securing the first detachable standoff and the second detachable standoff to the first grip, respectively, may include inserting a first set screw into a first set screw hole of the first detachable standoff, and inserting a second set screw into a second set screw hole of the second detachable standoff, securing the third detachable standoff and the fourth detachable standoff to the second grip, respectively, may include inserting a third set screw into a third set screw hole of the third detachable standoff, and inserting a fourth set screw into a fourth set screw hole of the fourth detachable standoff, securing the third detachable standoff to the first shoulder bolt may include inserting a fifth set screw into a fifth set screw hole of the third detachable standoff, and inserting a sixth set screw into a sixth set screw hole of the third detachable standoff, and securing the fourth detachable standoff to the second shoulder bolt may include inserting a seventh set screw into a seventh set screw hole of the fourth detachable standoff, and inserting an eighth set screw into an eighth set screw hole of the fourth detachable standoff.

The foregoing and/or other features and utilities of the present general inventive concept may also be achieved by providing an adjustable bent door pull to be installed on a first surface of a door, the adjustable bent door pull including a bent grip to facilitate gripping thereof, the bent grip including a main portion, and a bent portion angularly disposed on at least a portion of the main portion to extend away from the bent portion with respect to a lateral direction, and at least one detachable standoff removably connected to the bent grip to allow the bent grip to be attached to the first surface of the door, the at least one detachable standoff including an attachment portion comprising an aperture to receive the bent grip therein, a clamp portion disposed on a first end of the attachment portion to control movement of the bent grip through the aperture, an offset portion disposed on a second end of the attachment portion to extend away from the attachment portion in a first direction, and a protruding portion to extend away from the offset portion in a second direction different from the first direction to connect to the first surface of the door.

The clamp portion may include a clamp surface to connect to the offset portion, a clamp fastener head receiving aperture disposed within the clamp surface, and a clamp fastener to be inserted into the clamp fastener head receiving aperture to move the clamp portion toward the protruding portion in response to tightening the clamp fastener, and to move the clamp portion away from the protruding portion in response to extracting the clamp fastener.

The clamp fastener head receiving aperture may include a first clamp fastener receiving aperture disposed within the clamp surface.

The offset portion may include a second clamp fastener receiving aperture to receive at least a portion of the clamp fastener through the first clamp fastener receiving aperture.

The protruding portion may include a set screw receiving aperture, and a set screw to be inserted through a second surface of the door into the set screw receiving aperture to mount the protruding portion to the door.

The clamp portion may reduce movement of the bent grip in response to moving toward the protruding portion, such that the aperture contracts in size.

The clamp portion may increase movement of the bent grip in response to moving away from the protruding portion, such that the aperture expands in size.

The foregoing and/or other features and utilities of the present general inventive concept may also be achieved by providing an adjustable bent door pull to be installed on a first surface of a door, the adjustable bent door pull including a bent grip to facilitate gripping thereof, the bent grip including a main portion, and a bent portion angularly disposed on at least a portion of the main portion to extend away from the bent portion with respect to a lateral direction, and at least one detachable standoff removably connected to the bent grip to allow the bent grip to be attached to the first surface of the door, the at least one detachable standoff including an attachment portion comprising an aperture to receive the bent grip therein, a clamp portion disposed on a first end of the attachment portion to control movement of the bent grip through the aperture, and a protruding portion disposed on a second end of the attachment portion to connect to the first surface of the door.

The clamp portion may include a clamp surface to connect to the protruding portion, and a first clamp fastener receiving aperture disposed within the clamp surface.

The protruding portion may include a set screw receiving aperture, a clamp fastener head receiving aperture, a set screw to be inserted through a second surface of the door into the set screw receiving aperture to mount the protruding portion to the door, and a clamp fastener to be inserted into the clamp fastener head receiving aperture to move the clamp portion toward the protruding portion in response to tightening the clamp fastener, and to move the clamp portion away from the protruding portion in response to extracting the clamp fastener.

The protruding portion may further include a first auxiliary set screw receiving aperture perpendicularly disposed away from the set screw receiving aperture with respect to a first direction, a second auxiliary set screw receiving aperture perpendicularly disposed away from the set screw receiving aperture with respect to a second direction, a first auxiliary set screw to be inserted into the first auxiliary set screw receiving aperture to contact at least a portion of the set screw, and a second auxiliary set screw to be inserted into the second auxiliary set screw receiving aperture to contact at least another portion of the set screw, such that the first auxiliary set screw and the second auxiliary set screw prevent the set screw from being extracted from the set screw receiving aperture.

The clamp fastener head receiving aperture may include a second clamp fastener receiving aperture to receive at least a portion of the clamp fastener through the first clamp fastener receiving aperture.

The clamp portion may reduce movement of the bent grip in response to moving toward the protruding portion, such that the aperture contracts in size.

The clamp portion may increase movement of the bent grip in response to moving away from the protruding portion, such that the aperture expands in size.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being “connected” or “coupled” to another element, it can be directly connected or coupled to the other element or intervening elements may be present. In contrast, when an element is referred to as being “directly connected” or “directly coupled” to another element, there are no intervening elements present. Other words used to describe the relationship between elements should be interpreted in a like fashion (e.g., “between” versus “directly between,” “adjacent” versus “directly adjacent,” etc.).

The terminology used herein is for the purpose of describing particular embodiments only and is not intended to be limiting of example embodiments. As used herein, the singular forms “a,” “an” and “the” are intended to include the plural forms as well, unless the context clearly indicates otherwise. It will be further understood that the terms “comprises,” “comprising,” “includes” and/or “including,” when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
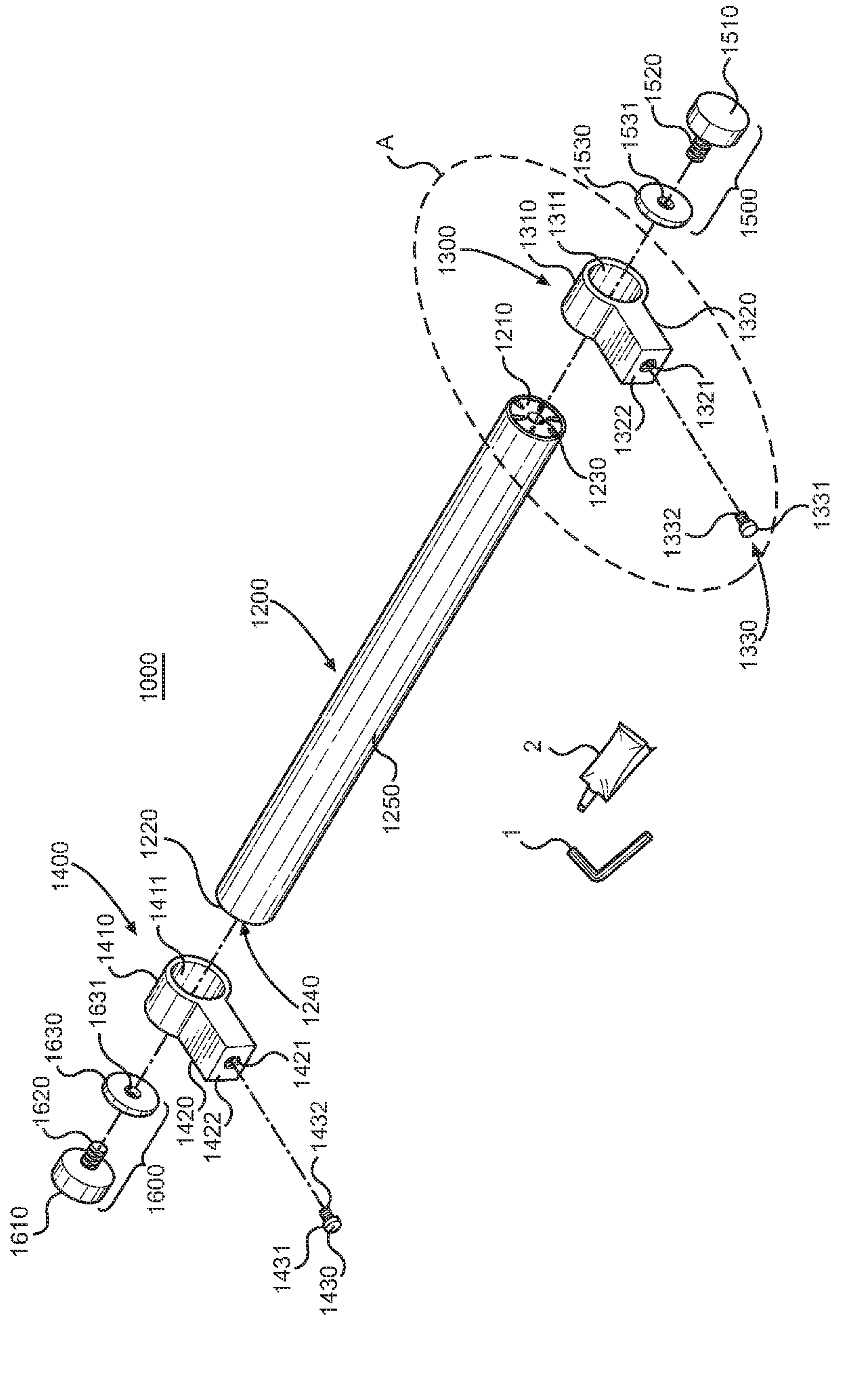
FIG. 1 is an exploded-view illustrating an adjustable door pull according to an exemplary embodiment of the present general inventive concept.

FIG. 1 is an exploded-view illustrating an adjustable door pull 1000, according to an exemplary embodiment of the present general inventive concept.

Referring to FIG. 1, the adjustable door pull 1000 may include a grip 1200, a first detachable standoff 1300, a second detachable standoff 1400, a first removable end cap 1500, and a second removable end cap 1600.

The grip 1200 (a.k.a., a handle 1200) may be provided to have various lengths, based on a user’s preference. More specifically, the user may desire the grip 1200 to be anywhere between six inches long to ten feet long, based on a type of door the grip 1200 is designed to open, and may be even shorter or longer based on the user’s preference. The grip 1200 may also be provided in various widths based on the user’s preference. Finally, the grip 1200 may be provided in various shapes, including, but not limited to, cylindrical, triangular, square, hexagonal, and octagonal.

The grip 1200 may include a first end 1210, a second end 1220, a first grip nut 1230 disposed at the first end 1210, a second grip nut 1240 disposed at the second end 1220, and a lateral surface 1250.

The first detachable standoff 1300 may include an attachment portion 1310 and a leg 1320.

The attachment portion 1310 may include an aperture 1311, which may be designed to correspond to a shape of the grip 1200, in order to allow the grip 1200 to slide into and be disposed within the aperture 1311.

The leg 1320 (a.k.a., a protruding portion 1320) may include a set screw hole 1321 to receive a set screw 1330 therein. The set screw hole 1321 may be disposed on an attachment surface 1322 of the leg 1320. The set screw 1330 may be inserted into the set screw hole 1321 to allow the user to use an allen wrench 1 at a first end 1331 of the set screw 1330 to tighten the set screw 1330 within the set screw hole 1321. When the set screw 1330 is tightened within the set screw hole 1321, a second end 1332 of the set screw 1330 contacts the lateral surface 1250 of the grip 1200. The set screw 1330 may first be snug-tightened within the set screw hole 1321 before being fully tightened, in order to ensure that the first detachable standoff 1300 is disposed at a proper location on the grip 1200. Preferably, the set screw 1330 is tightened within the set screw hole 1321 until the grip 1200 can no longer move within the aperture 1311. An optional adhesive 2 may be applied to the set screw 1330 prior to insertion within the set screw hole 1321, in order to prevent the set screw 1330 from being unscrewed from the set screw hole 1321.

The second detachable standoff 1400 may include an attachment portion 1410 and a leg 1420.

The attachment portion 1410 may include an aperture 1411, which may be designed to correspond to a shape of the grip 1200, in order to allow the grip 1200 to slide into and be disposed within the aperture 1411.

The leg 1420 (a.k.a., a protruding portion 1420) may include a set screw hole 1421 to receive a set screw 1430 therein. The set screw hole 1421 may be disposed on an attachment surface 1422 of the leg 1420. The set screw 1430 may be inserted into the set screw hole 1421 to allow the user to use the allen wrench 1 at a first end 1431 of the set screw 1430 to tighten the set screw 1430 within the set screw hole 1421. When the set screw 1430 is tightened within the set screw hole 1421, a second end 1432 of the set screw 1430 contacts the lateral surface 1250 of the grip 1200. The set screw 1430 may first be snug-tightened within the set screw hole 1421 before being fully tightened, in order to ensure that the second detachable standoff 1400 is disposed at a proper location on the grip 1200. Preferably, the set screw 1430 is tightened within the set screw hole 1421 until the grip 1200 can no longer move within the aperture 1411. The optional adhesive 2 may be applied to the set screw 1430 prior to insertion within the set screw hole 1421, in order to prevent the set screw 1430 from being unscrewed from the set screw hole 1421.

The first removable end cap 1500 may include a cap portion 1510, a threaded stud 1520, and a removable insert 1530. The threaded stud 1520 may be designed to be removably screwed into the first grip nut 1230 disposed at the first end 1210 of the grip 1200. The removable insert 1530 may include an aperture 1531 to allow the threaded stud 1520 to be inserted therethrough. As such, the removable insert 1530 may be optionally inserted between the cap portion 1510 of the first removable end cap 1500 and the first end 1210 of the grip 1200.

The second removable end cap 1600 may include a cap portion 1610, a threaded stud 1620 and a removable insert 1630. The threaded stud 1620 may be designed to be removably screwed into the second grip nut 1240 disposed at the second end 1220 of the grip 1200. The removable insert 1630 may include an aperture 1631 to allow the threaded stud 1620 to be inserted therethrough. As such, the removable insert 1630 may optionally be inserted between the cap portion 1610 of the second removable end cap 1600 and the second end 1220 of the grip 1200.

As a result, the user may change the removable inserts 1530 and 1630, as well as the cap portions 1510 and 1610, respectively, in order to include desired colors to correspond to certain times of the year, various holidays, or even company-based or university-based colors, for example.

Although two standoffs (i.e., the first detachable standoff 1300 and the second detachable standoff 1400) are illustrated in the embodiment of FIG. 1, as well as other embodiments, the present general inventive concept is not limited thereto, and a single standoff can be included, as well as three or more standoffs, based on a length of the grip.

Figure 2:
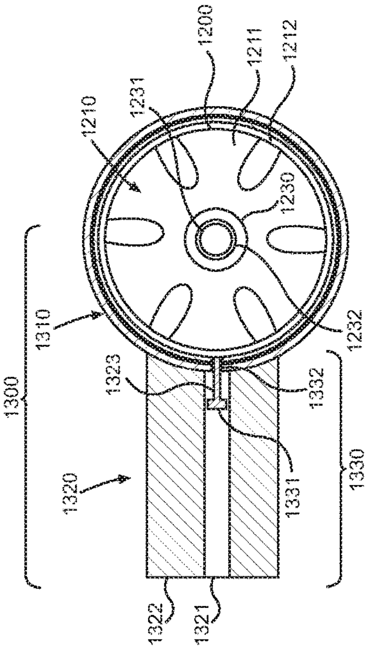
FIG. 2 is an exploded-view illustrating a mounting of an assembled adjustable door pull onto a door, according to an exemplary embodiment of the present general inventive concept.

FIG. 2 is a zoomed-in side-view perspective of a portion A of FIG. 1 such that the set screw 1330 is already disposed within the set screw hole 1321, according to an exemplary embodiment of the present general inventive concept.

As illustrated in FIG. 2, the set screw 1330 is already disposed within the set screw hole 1321. To attach the first detachable standoff 1300 to the grip 1200, the user may insert the grip 1200 into the aperture 1311 of the attachment portion 1310. Then, in order to secure the first detachable standoff 1300 to the grip 1200, the user may turn the first end 1331 of the set screw 1330 such that the set screw 1330 continues to enter a threaded portion 1323 of the set screw hole 1321. When the second end 1332 of the set screw 1330 contacts the lateral surface 1250 of the grip 1200, the first detachable standoff 1300 is secured to the grip 1200. As stated above, the optional adhesive 2 may be applied to the set screw 1330 prior to insertion within the set screw hole 1321, in order to prevent the set screw 1330 from being unscrewed from the set screw hole 1321.

Referring to FIGS. 1 and 2, the first side 1210 of the grip 1200 may include a first grip nut holding portion 1211, which allows the first grip nut 1230 to be disposed at a substantially center portion of the first side 1210. The first grip nut 1230 may include a threaded portion 1231 to allow the threaded stud 1520 of the first removable end cap 1500 to be inserted and tightened within an aperture 1232 of the first grip nut 1230. The first side 1210 of the grip 1200 may also include at least one aperture to prevent deformation of the first grip nut holding portion 1211 as a result of heat expansion and/or contraction.

Figure 3:
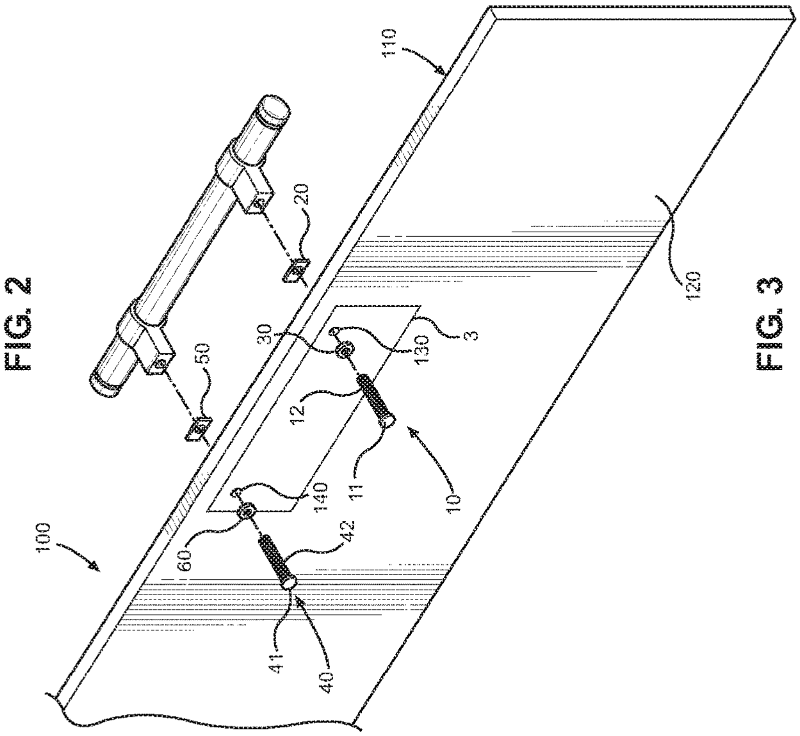
FIG. 3 is an exploded-view illustrating a mounting of an assembled adjustable door pull onto a door, according to an exemplary embodiment of the present general inventive concept.

FIG. 3 is an exploded-view illustrating a mounting of an assembled adjustable door pull 1000 onto a door 100, according to an exemplary embodiment of the present general inventive concept.

The door 100 may include an exterior surface 110, an interior surface 120, a first hole 130, and a second hole 140.

Referring to FIG. 3, a through-bolt 10 may be inserted through the first hole 130 from a side of the door 100 at the interior surface 120, such that a head 11 of the through-bolt 10 remains at the side of the door at the interior surface 120, while a threaded portion 12 of the through-bolt 10 is inserted within the first hole 130 to protrude out from another side of the door 100 at the exterior surface 110. The threaded portion 12 of the through-bolt 10 may be inserted and screwed into the set screw hole 1321 of the leg 1320 of the first detachable standoff 1300. When the through-bolt 10 is fully tightened within the set screw hole 1321, the attachment surface 1322 of the leg 1320 of the first detachable standoff 1300 may directly contact the exterior surface 120 of the door 100. Alternatively, a gasket 20 may be inserted between the exterior surface 120 of the door 100 and the attachment surface 1322 of the leg 1320 of the first detachable standoff 1300. Also, a washer 30 may be inserted between the head 11 of the through-bolt 10 and the interior surface 910 of the door 100. Inclusion of the gasket 20 and the washer 30 prevents damage to the door 100, while also allowing the adjustable door pull 1000 to be more securely attached to the door 100.

Referring again to FIG. 3, a through-bolt 40 may be inserted through the second hole 140 from the side of the door 100 at the interior surface 120, such that a head 41 of the through-bolt 40 remains at the side of the door at the interior surface 120, while a threaded portion 42 of the through-bolt 40 is inserted within the second hole 140 to protrude out from the another side of the door 100 at the exterior surface 110. The threaded portion 42 of the through-bolt 40 may be inserted and screwed into the set screw hole 1421 of the leg 1420 of the second detachable standoff 1400. When the through-bolt 40 is fully tightened within the set screw hole 1421, the attachment surface 1422 of the leg 1420 of the second detachable standoff 1400 may directly contact the exterior surface 120 of the door 100. Alternatively, a gasket 50 may be inserted between the exterior surface 120 of the door 100 and the attachment surface 1422 of the leg 420 of the second detachable standoff 1400. Also, a washer 60 may be inserted between the head 41 of the through-bolt 40 and the interior surface 110 of the door 100. Inclusion of either or both of the gasket 50 and the washer 60 prevents damage to the door 100, while also allowing the adjustable door pull 1000 to be more securely attached to the door 100.

As illustrated in FIG. 3, when the adjustable door pull 1000 is mounted on the exterior surface 120 of the door 100, an alternative door-opening mechanism 3 may be mounted on the interior surface 110 of the door 100. The alternative door-opening mechanism 3 may include a push plate, a door handle, or a touch bar, but is not limited thereto. Although the adjustable door pull 1000 has been illustrated in FIG. 2 to be mounted on the exterior surface 120 of the door 100, alternatively, the adjustable door pull 1000 may be mounted on the interior surface 110 of the door 100. When the adjustable door pull 1000 is mounted on the interior surface 110 of the door 100, the alternative door-opening mechanism 3 may be mounted on the exterior surface 120 of the door 100.

Figure 4:
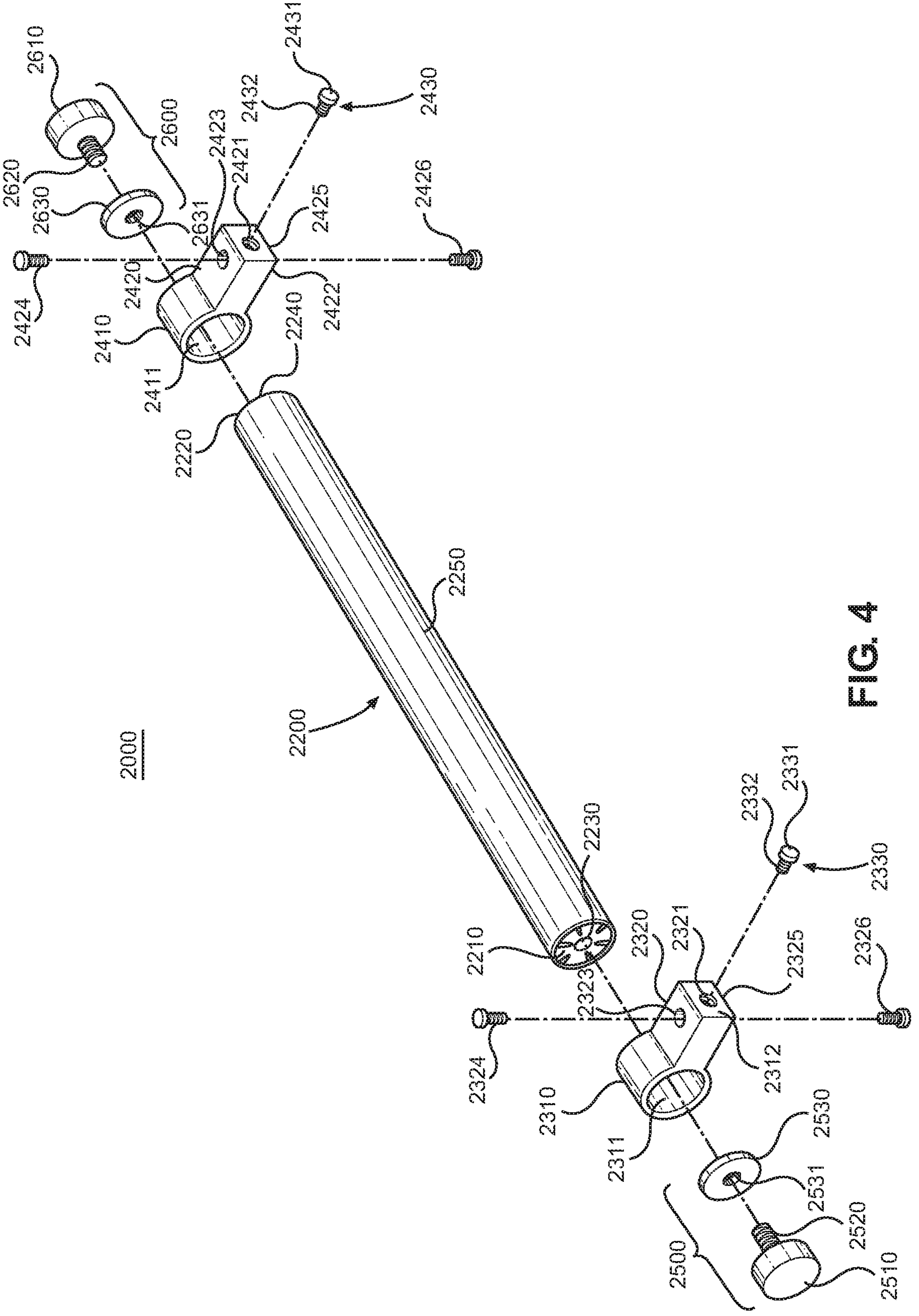
FIG. 4 is an exploded-view illustrating an adjustable door pull, according to another exemplary embodiment of the present general inventive concept.

FIG. 4 is an exploded-view illustrating an adjustable door pull 2000, according to another exemplary embodiment of the present general inventive concept.

Referring to FIG. 4, the adjustable door pull 2000 may include a grip 2200, a first detachable standoff 2300, a second detachable standoff 2400, a first removable end cap 2500, and a second removable end cap 2600.

The grip 2200 (a.k.a., a handle 2200) may be provided to have various lengths, based on a user's preference. More specifically, the user may desire the grip 2200 to be anywhere between six inches long to six feet long, based on a type of door the grip 2200 is designed to open. The grip 2200 may also be provided in various widths based on the user's preference. Finally, the grip 2200 may be provided in various shapes, including, but not limited to, cylindrical, triangular, square, hexagonal, and octagonal.

The grip 2200 may include a first end 2210, a second end 2220, a first grip nut 2230 disposed at the first end 2210, a second grip nut 2240 disposed at the second end 2220, and a lateral surface 2250.

The first detachable standoff 2300 may include an attachment portion 2310 and a leg 2320.

The attachment portion 2310 may include an aperture 2311, which may be designed to correspond to a shape of the grip 2200, in order to allow the grip 2200 to slide into and be disposed within the aperture 2311.

The leg 2320 (a.k.a., a protruding portion 2320) may include a set screw and shoulder bolt receiving hole 2321 to receive a set screw 2330 therein. The set screw and shoulder bolt receiving hole 2321 may be disposed on an attachment surface 2322 of the leg 2320. The set screw 2330 may be inserted into the set screw and shoulder bolt receiving hole 2321 to allow the user to use the allen wrench 1 at a first end 2331 of the set screw 2330 to tighten the set screw 2330 within the set screw and shoulder bolt receiving hole 2321. When the set screw 2330 is tightened within the set screw and shoulder bolt receiving hole 2321, a second end 2332 of the set screw 2330 contacts the lateral surface 2250 of the grip 2200. The set screw 2330 may first be snug-tightened within the set screw and shoulder bolt receiving hole 2321 before being fully tightened, in order to ensure that the first detachable standoff 2300 is disposed at a proper location on the grip 2200. Preferably, the set screw 2330 is tightened within the set screw and shoulder bolt receiving hole 2321 until the grip 2200 can no longer move within the aperture 2311. An optional adhesive 2 may be applied to the set screw 2330 prior to insertion within the set screw and shoulder bolt receiving hole 2321, in order to prevent the set screw 2330 from being unscrewed from the set screw and shoulder bolt receiving hole 2321.

The leg 2320 may also include a first auxiliary set screw hole 2323 to receive a first auxiliary set screw 2324 and a second auxiliary set screw hole 2325 to receive a second auxiliary set screw 2326.

The second detachable standoff 2400 may include an attachment portion 2410 and a leg 1420.

The attachment portion 2410 may include an aperture 2411, which may be designed to correspond to a shape of the grip 2200, in order to allow the grip 2200 to slide into and be disposed within the aperture 2411.

The leg 2420 (a.k.a., a protruding portion 2420) may include a set screw hole 2421 to receive a set screw 2430 therein. The set screw hole 2421 may be disposed on an attachment surface 2422 of the leg 2420. The set screw 2430 may be inserted into the set screw hole 2421 to allow the user to use an allen wrench 1 at a first end 2431 of the set screw 2430 to tighten the set screw 2430 within the set screw hole 2421. When the set screw 2430 is tightened within the set screw hole 2421, a second end 2432 of the set screw 2430 contacts the lateral surface 2250 of the grip 2200. The set screw 2430 may first be snug-tightened within the set screw hole 2421 before being fully tightened, in order to ensure that the second detachable standoff 2400 is disposed at a proper location on the grip 2200. Preferably, the set screw 2430 is tightened within the set screw hole 2421 until the grip 2200 can no longer move within the aperture 2411. The optional adhesive 2 may be applied to the set screw 2430 prior to insertion within the set screw hole 2421, in order to prevent the set screw 2430 from being unscrewed from the set screw hole 2421.

The leg 2420 may also include a first auxiliary set screw hole 2423 to receive a first auxiliary set screw 2424 and a second auxiliary set screw 2425 hole to receive a second auxiliary set screw 2426.

The first removable end cap 2500 may include a threaded stud 2510 and a removable insert 2520. The threaded stud 2510 may be designed to be removably screwed into the first grip nut 2230 disposed at the first end 2210 of the grip 2200. The removable insert 2520 may include an aperture 2521 to allow the threaded stud 2510 to be inserted therethrough. As such, the removable insert 2520 may be optionally inserted between the first removable end cap 2500 and the first end 2210 of the grip 2200.

The second removable end cap 2600 may include a threaded stud 2610 and a removable insert 2620. The threaded stud 2610 may be designed to be removably screwed into the second grip nut 2240 disposed at the second end 2220 of the grip 2200. The removable insert 2620 may include an aperture 2621 to allow the threaded stud 2610 to be inserted therethrough. As such, the removable insert 2620 may optionally be inserted between the second removable end cap 2600 and the second end 2220 of the grip 2200.

Figure 5:
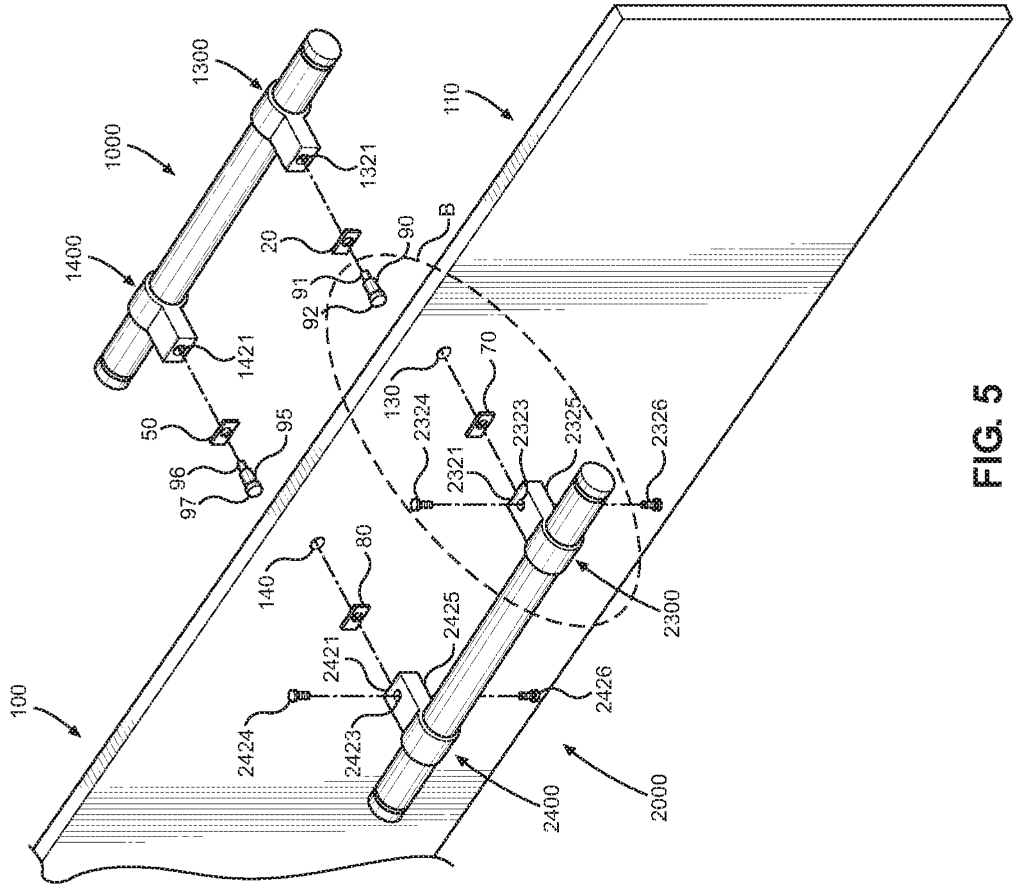
FIG. 5 is an exploded-view illustrating a mounting of the assembled adjustable door pull of FIG. 1 and an assembled adjustable door pull of FIG. 4 onto the door, according to another exemplary embodiment of the present general inventive concept.

FIG. 5 is an exploded-view illustrating a mounting of the assembled adjustable door pull 1000 of FIG. 1 and an assembled adjustable door pull 2000 of FIG. 4 onto the door 100, according to another exemplary embodiment of the present general inventive concept.

The another exemplary embodiment of FIG. 5 is directed to a mounting of the adjustable door pull 1000 on the exterior surface 120 of the door 100, and a mounting of the adjustable door pull 2000 on the interior surface 110 of the door 100.

Referring to FIG. 5, a shoulder bolt 90 may be inserted through the gasket 20, and then a threaded portion 91 of the shoulder bolt 90 may be screwed into the set screw hole 1321 of the first detachable standoff 1300. Then, in order to attach both the first detachable standoff 1300 and the first detachable standoff 2300 to the door 100, the shoulder bolt 90 may be inserted through the first hole 130 from the side of the door 100 at the exterior surface 110, such that a head 92 of the shoulder bolt 90 remains at the side of the door 100 at the interior surface 120 in order to be inserted through a gasket 70 and then inserted into the set screw and shoulder bolt receiving hole 2321 of the first detachable standoff 2300. In order to fully secure the shoulder bolt 90 to the first detachable standoff 2300, the auxiliary set screw 2324 may be screwed into the auxiliary set screw hole 2323 until it contacts a side of the shoulder bolt 90, and the auxiliary set screw 2326 may be screwed into the auxiliary set screw hole 2325 until it contacts another side of the shoulder bolt 90.

Referring again to FIG. 5, a shoulder bolt 95 may be inserted through the gasket 50, and then a threaded portion 96 of the shoulder bolt 95 may be screwed into the set screw hole 1421 of the second detachable standoff 1400. Then, in order to attach both the second detachable standoff 1400 and the second detachable standoff 2400 to the door 100, the shoulder bolt 95 may be inserted through the second hole 140 from the side of the door 100 at the exterior surface 110, such that a head 97 of the shoulder bolt 95 remains at the side of the door 100 at the interior surface 120 in order to be inserted through a gasket 80 and then inserted into the set screw and shoulder bolt receiving hole 2421 of the second detachable standoff 2400. In order to fully secure the shoulder bolt 95 to the second detachable standoff 2400, the auxiliary set screw 2424 may be screwed into the auxiliary set screw hole 2423 until it contacts a side of the shoulder bolt 95, and the auxiliary set screw 2426 may be screwed into the auxiliary set screw hole 2425 until it contacts another side of the shoulder bolt 95.

Referring to FIG. 5, although the adjustable door pull 1000 has been illustrated to be mounted on the exterior surface 120 of the door 100, and the adjustable door pull 2000 has been illustrated to be mounted on the interior surface 110 of the door 100, alternatively, the adjustable door pull 1000 may be mounted on the interior surface 120 of the door 100, and the adjustable door pull 2000 may be mounted on the exterior surface 110 of the door 100.

An optional adhesive may be applied to any set screws or auxiliary set screws in the present general inventive concept, in order to fully secure the set screws or auxiliary set screws within their respective holes.

Figure 6:
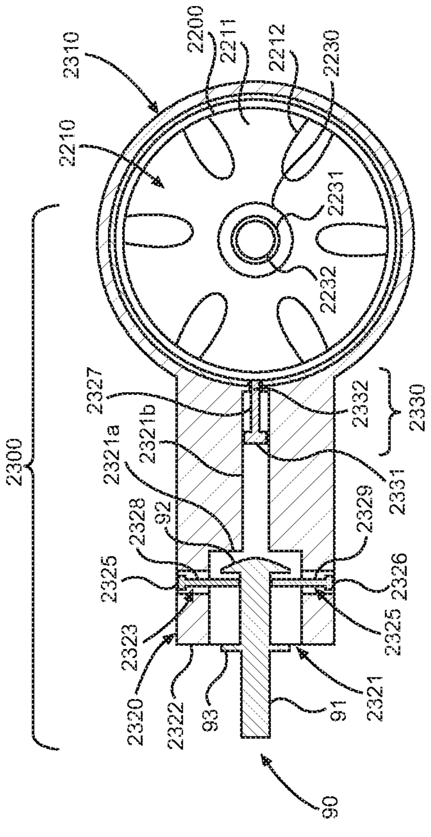
FIG. 6 is a zoomed-in side-view perspective of a portion B of FIG. 5 such that the shoulder bolt is already disposed within the set screw and shoulder bolt receiving hole, according to another exemplary embodiment of the present general inventive concept.

FIG. 6 is a zoomed-in side-view perspective of a portion B of FIG. 5 such that the shoulder bolt 90 is already disposed within the set screw and shoulder bolt receiving hole 2321, according to another exemplary embodiment of the present general inventive concept.

As illustrated in FIG. 6, the set screw 2330 is already disposed within the set screw and shoulder bolt receiving hole 2321. To attach the first detachable standoff 2300 to the grip 2200, the user may insert the grip 2200 into the aperture 2311 of the attachment portion 2310. Then, in order to secure the first detachable standoff 2300 to the grip 2200, the user may turn the first end 2331 of the set screw 2330 such that the set screw 2330 continues to enter a threaded portion 2327 of the set screw hole 2321. When the second end 2332 of the set screw 2330 contacts the lateral surface 2250 of the grip 2200, the first detachable standoff 2300 is secured to the grip 2200. As stated above, the optional adhesive 2 may be applied to the set screw 2330 prior to insertion within the set screw hole 2321, in order to prevent the set screw 2330 from being unscrewed from the set screw hole 2321.

Referring to FIGS. 5 and 6, the first side 1210 of the grip 1200 may include a first grip nut holding portion 2211, which allows the first grip nut 2230 to be disposed at a substantially center portion of the first side 2210. The first grip nut 2230 may include a threaded portion 1231 to allow the threaded stud 2520 of the first removable end cap 2500 to be inserted and tightened within an aperture 2232 of the first grip nut 2230. The first side 2210 of the grip 2200 may also include at least one aperture 2212 to prevent deformation of the first grip nut holding portion 2211 as a result of heat expansion and/or contraction.

As illustrated in FIG. 6, the shoulder bolt 90 is already disposed within the set screw and shoulder bolt receiving hole 2321. More specifically, the shoulder bolt 90 is disposed within a shoulder bolt receiving portion 2321*a* of the set screw and shoulder bolt receiving hole 2321, while the set screw 2330 is disposed within a set screw receiving portion 2321*b* of the set screw and shoulder bolt receiving hole 2321. The threaded portion 91 of the shoulder bolt 90 may be designed to be screwable within the set screw hole 1321 of the first detachable standoff 1300. The shoulder bolt 90 may include a shoulder 93 to allow the gasket 20 to be securely disposed between the shoulder 93 and the attachment surface 1322 of the first detachable standoff 1300 at a first side of the shoulder 93. The shoulder 93 may also allow the gasket 70 to be securely disposed between the shoulder 93 and the attachment surface 2322 of the first detachable standoff 2300 at a second side of the shoulder 93. In order to fully secure the shoulder bolt 90 to the first detachable standoff 2300, the auxiliary set screw 2324 may be screwed into the auxiliary set screw hole 2323 via a threaded portion 2328, until the auxiliary set screw 2324 contacts a side of the shoulder bolt 90, and the auxiliary set screw 2326 may be screwed into the auxiliary set screw hole 2325 via a threaded portion 2329, until auxiliary set screw 2326 contacts another side of the shoulder bolt 90. The head 92 of the shoulder bolt 90 may have an enlarged bulbous shape. The auxiliary set screw 2324 and the auxiliary set screw 2326 may contact a back side of the head 92 of the shoulder bolt 90, in order to prevent the shoulder bolt 90 from being unscrewed.

Figure 7:
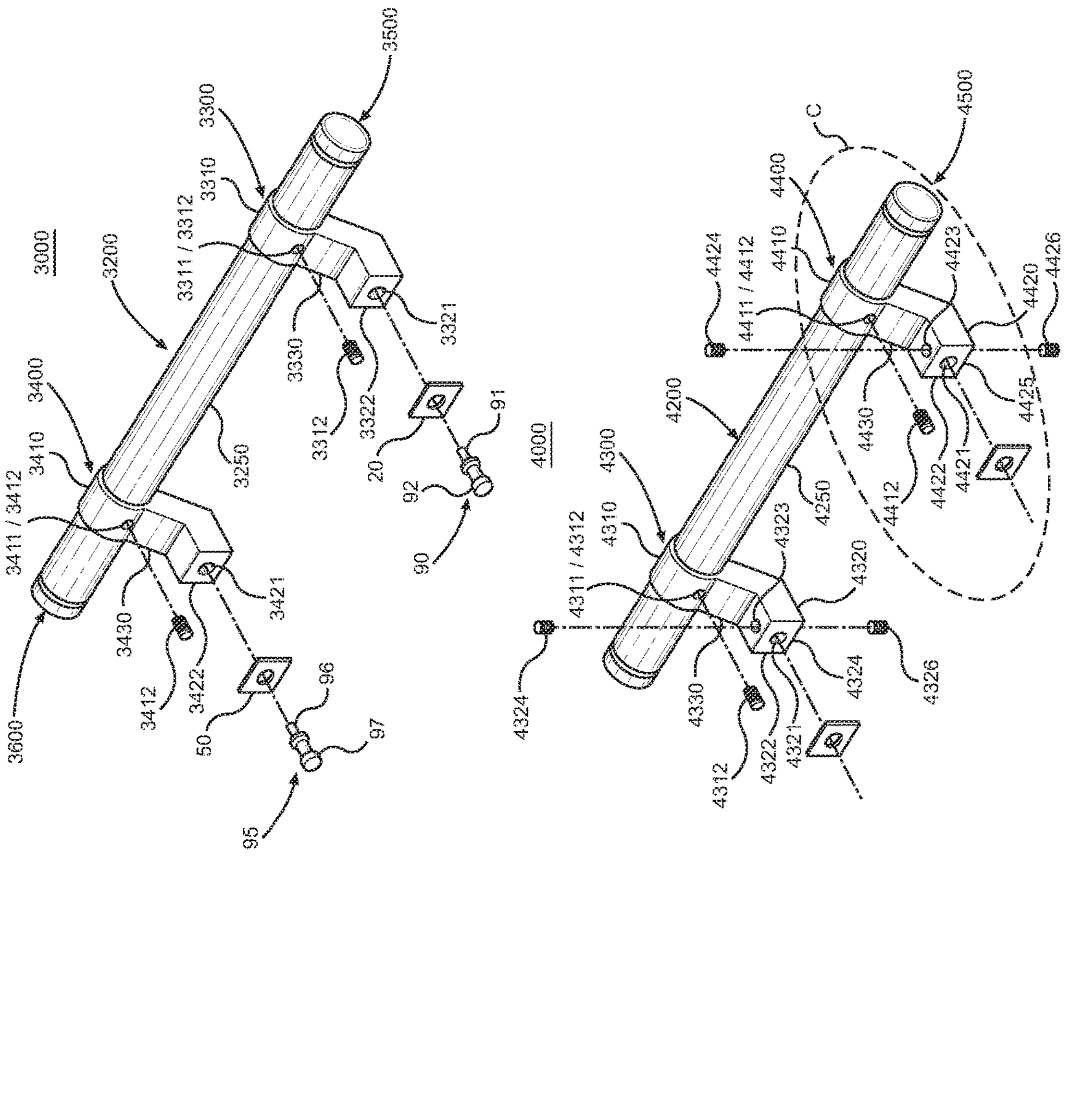
FIG. 7 is an exploded-view illustrating an adjustable door pull and another adjustable door pull, according to another exemplary embodiment of the present general inventive concept.

FIG. 7 is an exploded-view illustrating an adjustable door pull 3000 and an adjustable door pull 4000, according to another exemplary embodiment of the present general inventive concept. Similar components that have already been described will not be again described in order to prevent redundancy. Also, either or both of the adjustable door pull 3000 and the adjustable door pull 4000 of FIG. 7 may be assembled as described and illustrated in the embodiments of FIGS. 3 and 5.

Referring to FIG. 7, the adjustable door pull 3000 may include a grip 3200, a first detachable standoff 3300, a second detachable standoff 3400, a first removable end cap 3500, and a second removable end cap 3600.

The grip 3200 (a.k.a., a handle 3200) may be provided to have various lengths, based on a user's preference. More specifically, the user may desire the grip 3200 to be anywhere between six inches long to six feet long, based on a type of door the grip 3200 is designed to open. The grip 3200 may also be provided in various widths based on the user's preference. Finally, the grip 3200 may be provided in various shapes, including, but not limited to, cylindrical, triangular, square, hexagonal, and octagonal.

The first detachable standoff 3300 may include an attachment portion 3310, an attaching leg portion 3320, and an offset portion 3330.

The attachment portion 3310 may fit around the grip 3200, in order to allow the grip 3200 to slide into the attachment portion 3310. The attachment portion 3310 may include a set screw hole 3311 to receive a set screw 3312 therein. The set screw hole 3311 may be disposed on an outer surface of the attachment portion 3310. The set screw 3312 may be inserted into the set screw hole 3311 to allow the user to use the allen wrench 1 to tighten the set screw 3312 within the set screw hole 3311. When the set screw 3312 is tightened within the set screw hole 3311, the set screw 3312 may contacts a lateral surface 3250 of the grip 3200. The set screw 3312 may first be snug-tightened within the set screw hole 3311 before being fully tightened, in order to ensure that the first detachable standoff 3300 is disposed at a proper location on the grip 3200. Preferably, the set screw 3312 is tightened within the set screw hole 3311 until the grip 3200 can no longer move within an aperture of the attachment portion 3310. An optional adhesive 2 may be applied to the set screw 3312 prior to insertion within the set screw hole 3311, in order to prevent the set screw 3312 from being unscrewed from the set screw hole 3311.

As illustrated in FIG. 7, the attaching leg portion 3320 may be offset from the grip 3200 by the offset portion 3330.

The second detachable standoff 3400 may include an attachment portion 3410, an attaching leg portion 3420, and an offset portion 3430.

The attachment portion 3410 may fit around the grip 3200, in order to allow the grip 3200 to slide into the attachment portion 3410. The attachment portion 3410 may include a set screw hole 3411 to receive a set screw 3412 therein. The set screw hole 3411 may be disposed on an outer surface of the attachment portion 3410. The set screw 3412 may be inserted into the set screw hole 3411 to allow the user to use the allen wrench 1 to tighten the set screw 3412 within the set screw hole 3411. When the set screw 3412 is tightened within the set screw hole 3411, the set screw 3412 may contacts a lateral surface 3250 of the grip 3200. The set screw 3412 may first be snug-tightened within the set screw hole 3411 before being fully tightened, in order to ensure that the second detachable standoff 3400 is disposed at a proper location on the grip 3200. Preferably, the set screw 3412 is tightened within the set screw hole 3411 until the grip 3200 can no longer move within an aperture of the attachment portion 3410. An optional adhesive 2 may be applied to the set screw 3412 prior to insertion within the set screw hole 3411, in order to prevent the set screw 3412 from being unscrewed from the set screw hole 3411.

As illustrated in FIG. 7, the attaching leg portion 3420 may be offset from the grip 3200 by the offset portion 3430.

Referring to FIG. 7, the adjustable door pull 4000 may include a grip 4200, a first detachable standoff 4300, a second detachable standoff 4400, a first removable end cap 4500, and a second removable end cap 4600.

The grip 4200 (a.k.a., a handle 4200) may be provided to have various lengths, based on a user's preference. More specifically, the user may desire the grip 4200 to be anywhere between six inches long to six feet long, based on a type of door the grip 4200 is designed to open. The grip 4200 may also be provided in various widths based on the user's preference. Finally, the grip 4200 may be provided in various shapes, including, but not limited to, cylindrical, triangular, square, hexagonal, and octagonal.

The first detachable standoff 4300 may include an attachment portion 4310, an attaching leg portion 4320, and an offset portion 4330.

The attachment portion 4310 may fit around the grip 4200, in order to allow the grip 4200 to slide into the attachment portion 4310. The attachment portion 4310 may include a set screw hole 4311 to receive a set screw 4312 therein. The set screw hole 4311 may be disposed on an outer surface of the attachment portion 4310. The set screw 4312 may be inserted into the set screw hole 4311 to allow the user to use the allen wrench 1 to tighten the set screw 4312 within the set screw hole 4311. When the set screw 4312 is tightened within the set screw hole 4311, the set screw 4312 may contacts a lateral surface 4250 of the grip 4200. The set screw 4312 may first be snug-tightened within the set screw hole 4311 before being fully tightened, in order to ensure that the first detachable standoff 4300 is disposed at a proper location on the grip 4200. Preferably, the set screw 4312 is tightened within the set screw hole 4311 until the grip 4200 can no longer move within an aperture of the attachment portion 4310. An optional adhesive 2 may be applied to the set screw 4312 prior to insertion within the set screw hole 4311, in order to prevent the set screw 4312 from being unscrewed from the set screw hole 4311.

As illustrated in FIG. 7, the attaching leg portion 4320 may be offset from the grip 4200 by the offset portion 4330.

The attaching leg portion 4300 may also include a first auxiliary set screw hole 4323 to receive a first auxiliary set screw 4324 and a second auxiliary set screw hole 4325 to receive a second auxiliary set screw 4326.

The second detachable standoff 4400 may include an attachment portion 4410, an attaching leg portion 4420, and an offset portion 4430.

The attachment portion 4410 may fit around the grip 4200, in order to allow the grip 4200 to slide into the attachment portion 4410. The attachment portion 4410 may include a set screw hole 4411 to receive a set screw 4412 therein. The set screw hole 4411 may be disposed on an outer surface of the attachment portion 4410. The set screw 4412 may be inserted into the set screw hole 4411 to allow the user to use the allen wrench 1 to tighten the set screw 4412 within the set screw hole 4411. When the set screw 4412 is tightened within the set screw hole 4411, the set screw 4412 may contacts a lateral surface 4250 of the grip 4200. The set screw 4412 may first be snug-tightened within the set screw hole 4411 before being fully tightened, in order to ensure that the second detachable standoff 4400 is disposed at a proper location on the grip 4200. Preferably, the set screw 4412 is tightened within the set screw hole 4411 until the grip 4200 can no longer move within an aperture of the attachment portion 4410. An optional adhesive 2 may be applied to the set screw 4412 prior to insertion within the set screw hole 4411, in order to prevent the set screw 4412 from being unscrewed from the set screw hole 4411.

As illustrated in FIG. 7, the attaching leg portion 4420 may be offset from the grip 4200 by the offset portion 4430.

The attaching leg portion 4400 may also include a first auxiliary set screw hole 4423 to receive a first auxiliary set screw 4424 and a second auxiliary set screw hole 4425 to receive a second auxiliary set screw 4426.

Referring to FIGS. 5 and 7, the adjustable door pull 3000 may be mounted on the exterior surface 120 of the door 100, and the adjustable door pull 4000 may be mounted on the interior surface 110 of the door 100.

Referring to FIGS. 5 and 7, a shoulder bolt 90 may be inserted through the gasket 20, and then a threaded portion 91 of the shoulder bolt 90 may be screwed into the bolt receiving hole 3321 of the first detachable standoff 3300. Then, in order to attach both the first detachable standoff 3300 and the first detachable standoff 4300 to the door 100, the shoulder bolt 90 may be inserted through the first hole 130 from the side of the door 100 at the exterior surface 110, such that a head 92 of the shoulder bolt 90 remains at the side of the door 100 at the interior surface 120 in order to be inserted through the gasket 70 and then inserted into the bolt receiving hole 4321 of the first detachable standoff 4300. In order to fully secure the shoulder bolt 90 to the first detachable standoff 4300, the auxiliary set screw 4324 may be screwed into the auxiliary set screw hole 4323 until it contacts a side of the shoulder bolt 90, and the auxiliary set screw 4326 may be screwed into the auxiliary set screw hole 4325 until it contacts another side of the shoulder bolt 90.

Referring again to FIGS. 5 and 7, a shoulder bolt 95 may be inserted through the gasket 50, and then a threaded portion 96 of the shoulder bolt 95 may be screwed into the set screw hole 3421 of the second detachable standoff 3400. Then, in order to attach both the second detachable standoff 3400 and the second detachable standoff 4400 to the door 100, the shoulder bolt 95 may be inserted through the second hole 140 from the side of the door 100 at the exterior surface 110, such that a head 97 of the shoulder bolt 95 remains at the side of the door 100 at the interior surface 120 in order to be inserted through the gasket 80 and then inserted into the set screw and shoulder bolt receiving hole 4421 of the second detachable standoff 4400. In order to fully secure the shoulder bolt 95 to the second detachable standoff 2400, the auxiliary set screw 4424 may be screwed into the auxiliary set screw hole 4423 until it contacts a side of the shoulder bolt 95, and the auxiliary set screw 4426 may be screwed into the auxiliary set screw hole 4425 until it contacts another side of the shoulder bolt 95.

As a result, the adjustable door pull 3000 may be mounted on the exterior surface 120 of the door 100, and the adjustable door pull 4000 may be mounted on the interior surface 110 of the door 100.

Alternatively, if the user desires to install only the adjustable door pull 3000 only on one side of the door 100, then the user may apply the configuration of FIG. 3 to the present embodiment. More specifically, the threaded portion 12 of the through-bolt 10 may be inserted and screwed into the bolt receiving hole 3321 of the attaching leg portion 3320 of the first detachable standoff 3300. When the through-bolt 10 is fully tightened within the bolt receiving hole 3321, the attachment surface 3322 of the attaching leg portion 3320 of the first detachable standoff 3300 may directly contact the exterior surface 120 of the door 100. Alternatively, the gasket 20 may be inserted between the exterior surface 120 of the door 100 and the attachment surface 3322 of the attaching leg portion 3320 of the first detachable standoff 3300. Also, the washer 30 may be inserted between the head 11 of the through-bolt 10 and the interior surface 910 of the door 100. Inclusion of the gasket 20 and the washer 30 prevents damage to the door 100, while also allowing the adjustable door pull 1000 to be more securely attached to the door 100.

Figure 8:
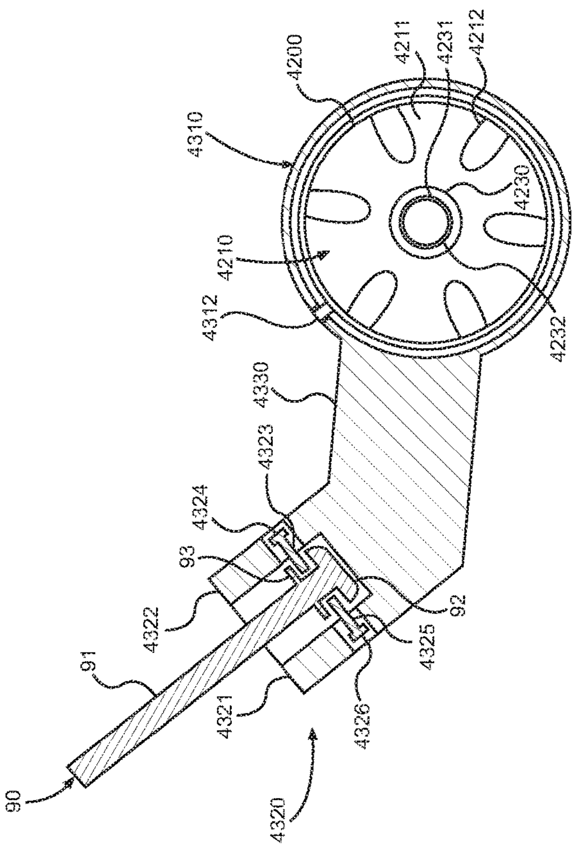
FIG. 8 is a zoomed-in side-view perspective of a portion C of FIG. 7 such that the shoulder bolt is already disposed within the bolt receiving hole, according to another exemplary embodiment of the present general inventive concept.

FIG. 8 is a zoomed-in side-view perspective of a portion C of FIG. 7 such that the shoulder bolt 90 is already disposed within the bolt receiving hole 3321, according to another exemplary embodiment of the present general inventive concept.

As illustrated in FIGS. 7 and 8, the set screw 4312 is already disposed within the set screw hole 4311. To attach the first detachable standoff 4300 to the grip 4200, the user may insert the grip 4200 into an aperture of the attachment portion 4310. Then, in order to secure the first detachable standoff 4300 to the grip 4200, the user may turn the set screw 4312 such that the set screw 4312 continues to enter the set screw hole 4311. When the set screw 4312 contacts the lateral surface 4250 of the grip 4200, the first detachable standoff 4300 is secured to the grip 4200. As stated above, the optional adhesive 2 may be applied to the set screw 4312 prior to insertion within the set screw hole 4311, in order to prevent the set screw 4312 from being unscrewed from the set screw hole 4311.

Referring to FIGS. 7 and 8, a first side 4210 of the grip 4200 may include a first grip nut holding portion 4211, which allows a first grip nut 4230 to be disposed at a substantially center portion of the first side 4210. The first grip nut 4230 may include a threaded portion 4231 to allow the threaded stud 4520 of the first removable end cap 4500 to be inserted and tightened within an aperture 4232 of the first grip nut 4230. The first side 4210 of the grip 4200 may also include at least one aperture 4212 to prevent deformation of the first grip nut holding portion 4211 as a result of heat expansion and/or contraction.

As illustrated in FIG. 8, the shoulder bolt 90 is already disposed within the bolt receiving hole 4321. The threaded portion 91 of the shoulder bolt 90 may be designed to be screwable within the set screw hole 3321 of the first detachable standoff 3300. The shoulder bolt 90 may include a shoulder 93 to allow the gasket 20 to be securely disposed between the shoulder 93 and the attachment surface 3322 of the first detachable standoff 3300 at a first side of the shoulder 93. The shoulder 93 may also allow the gasket 70 to be securely disposed between the shoulder 93 and the attachment surface 4322 of the first detachable standoff 3300 at a second side of the shoulder 93. In order to fully secure the shoulder bolt 90 to the first detachable standoff 4300, the auxiliary set screw 4324 may be screwed into the auxiliary set screw hole 4323 via a threaded portion 4328 until the auxiliary set screw 4324 contacts a side of the shoulder bolt 90, and the auxiliary set screw 4326 may be screwed into the auxiliary set screw hole 4325 via a threaded portion 4329 until the auxiliary set screw 4326 contacts another side of the shoulder bolt 90. The head 92 of the shoulder bolt 90 may have an enlarged bulbous shape. The auxiliary set screw 4324 and the auxiliary set screw 4326 may contact a back side of the head 92 of the shoulder bolt 90, in order to prevent the shoulder bolt 90 from being unscrewed.

Figure 9:
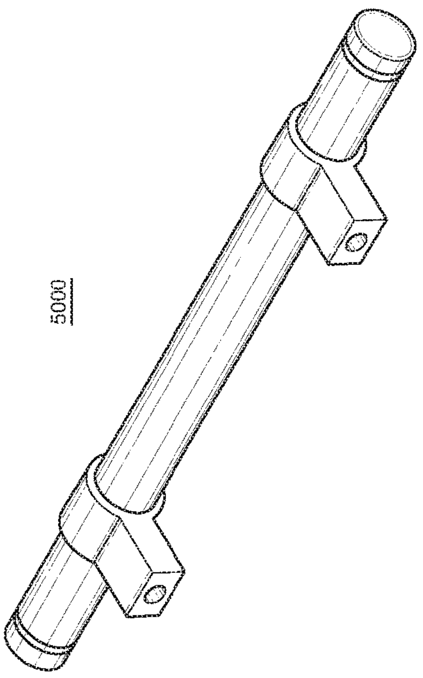
FIG. 9 is a view illustrating an assembled adjustable door pull with an etched-in "TRIMCO" word-mark, according to another exemplary embodiment of the present general inventive concept.

FIG. 9 is a view illustrating an assembled adjustable door pull 500 with an etched-in "TRIMCO" word-mark, according to another exemplary embodiment of the present general inventive concept.

It should also be noted that all of the above embodiments of the present general inventive concept may be designed, constructed, manufactured, and/or made from any type of material, including, but not limited to, metals, alloys, plastics, wood, and glass.

However, it may be preferred to use specially formulated copper alloys that are registered by the U.S. Environmental Protection Agency (EPA). When cleaned regularly, these copper alloys have been proven to kill 99.9% of the most virulent bacteria like e-Coli, MRSA and Staph*. This is not a coating, but rather an all-natural, solid copper-based alloy that will last for the life of the present general inventive concept.

The specially formulated copper alloys has a myriad of benefits, including, but not limited to: killing 99.9% of bacteria in 2 hours or less; being durable because it is not a coating that would wear off; killing bacteria for the lifetime of the present general inventive concept; having an appearance of stainless steel to match other hardware products; being fully recyclable; and being applicable to all types of hardware, including, but not limited to push/pull plates, door pulls, door handles, touch bars, latch sets, and pull bars.

Figure 10:
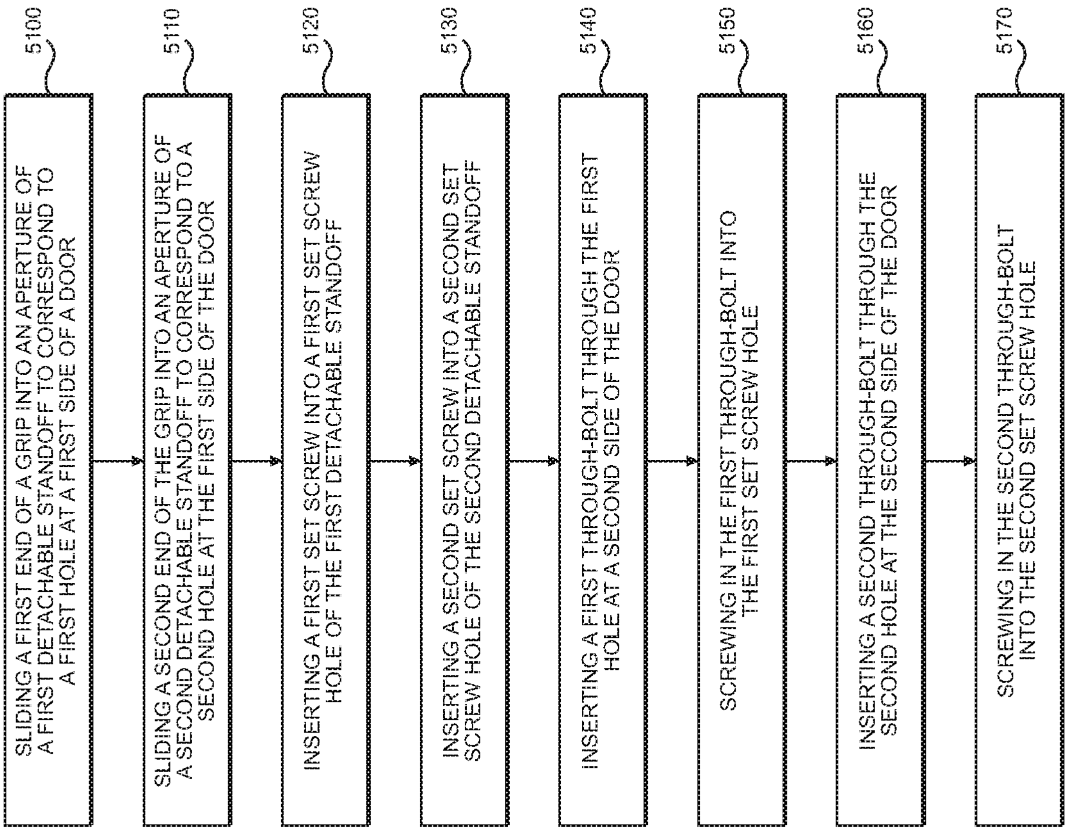
FIG. 10 illustrates a method of installing an adjustable pull onto a door, according to an exemplary embodiment of the present general inventive concept.

FIG. 10 illustrates a method of installing an adjustable pull onto a door, according to an exemplary embodiment of the present general inventive concept.

The method of FIG. 10 may include sliding a first end of a grip into an aperture of a first detachable standoff to correspond to a first hole at a first side of a door at S100, and then sliding a second end of the grip into an aperture of a second detachable standoff to correspond to a second hole at the first side of the door at S110. The method may also include inserting a first set screw into a first set screw hole of the first detachable standoff at S120, and then inserting a second set screw into a second set screw hole of the second detachable standoff at S130, thereby securing the first detachable standoff and the second detachable standoff to the grip, respectively. The method may further include inserting a first through-bolt through the first hole at a second side of the door at S140, and then screwing in the first through-bolt into the first set screw hole at S150 to secure the first detachable standoff to the door. Additionally, the method may include inserting a second through-bolt through the second hole at the second side of the door at S160, and then screwing in the second through-bolt into the second set screw hole at S170 to secure the second detachable standoff to the door.

Figure 11:
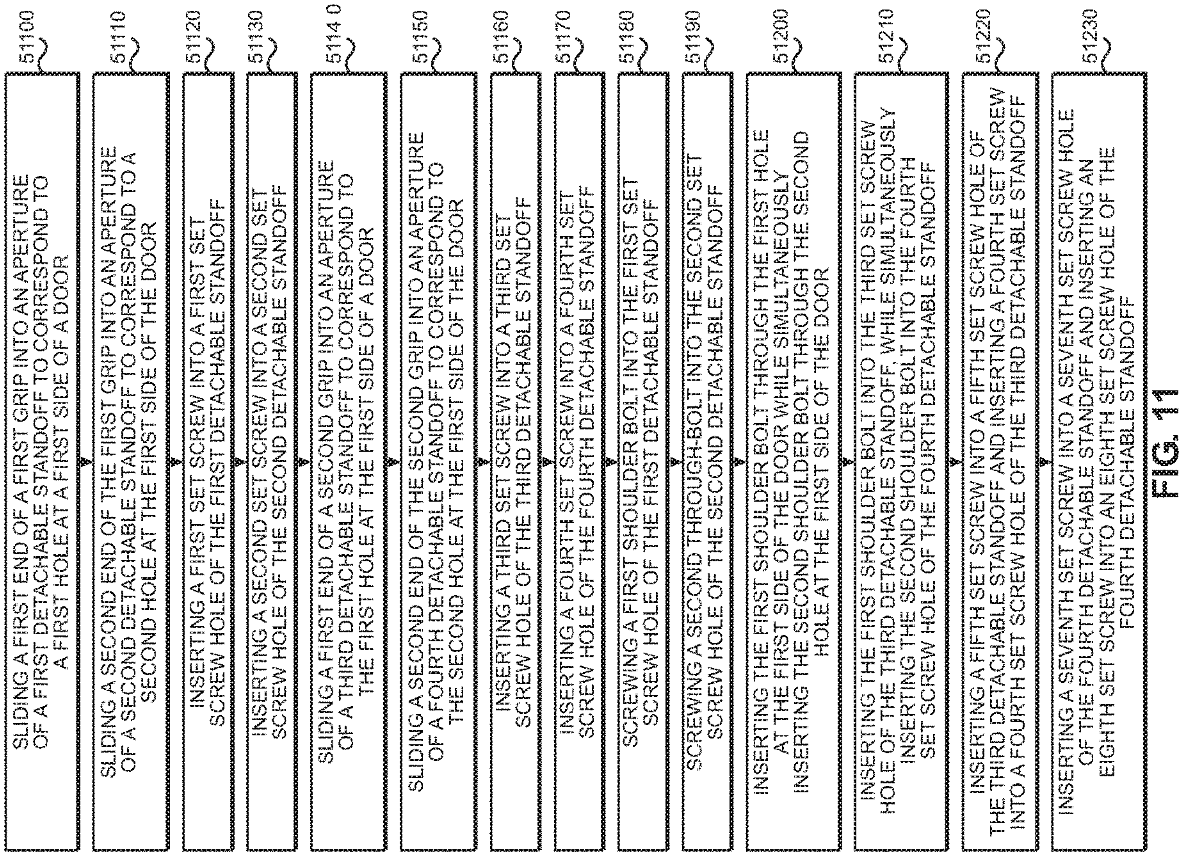
FIG. 11 illustrates a method of installing two adjustable pulls onto a door, according to another exemplary embodiment of the present general inventive concept.

FIG. 11 illustrates a method of installing two adjustable pulls onto a door, according to another exemplary embodiment of the present general inventive concept.

The method of FIG. 11 may include sliding a first end of a first grip into an aperture of a first detachable standoff to correspond to a first hole at a first side of a door at S1100, and then sliding a second end of the first grip into an aperture of a second detachable standoff to correspond to a second hole at the first side of the door at S1110. The method may also include inserting a first set screw into a first set screw hole of the first detachable standoff at S1120, and then inserting a second set screw into a second set screw hole of the second detachable standoff at S1130, thereby securing the first detachable standoff and the second detachable standoff to the first grip, respectively. Next, the method may include sliding a first end of a second grip into an aperture of a third detachable standoff to correspond to the first hole at the first side of the door at S1140, and then sliding a second end of the second grip into an aperture of a fourth detachable standoff to correspond to the second hole at the first side of the door at S1150. The method may also include inserting a third set screw into a third set screw hole of the third detachable standoff at S1160, and then inserting a fourth set screw into a fourth set screw hole of the fourth detachable standoff at S1170, thereby securing the third detachable standoff and the fourth detachable standoff to the second grip, respectively. The method may further include screwing a first shoulder bolt into the first set screw hole of the first detachable standoff at S1180, and then screwing a second shoulder bolt into the second set screw hole of the second detachable standoff at S1190. Additionally, the method may include inserting the first shoulder bolt through the first hole at the first side of the door while simultaneously inserting the second shoulder bolt through the second hole at the first side of the door at S1200. Next, the method may include inserting the first shoulder bolt into the third set screw hole of the third detachable standoff, while simultaneously inserting the second shoulder bolt into the fourth set screw hole of the fourth detachable standoff at S1210. Subsequently, the method may include inserting a fifth set screw into a fifth set screw hole of the third detachable standoff and inserting a sixth set screw into a sixth set screw hole of the third detachable standoff at S1220, thereby securing the third detachable standoff to the first shoulder bolt. Further, the method may include inserting a seventh set screw into a seventh set screw hole of the fourth detachable standoff and inserting an eighth set screw into an eighth set screw hole of the fourth detachable standoff at S1230, thereby securing the fourth detachable standoff to the second shoulder bolt.

FIGS. 12A through 12F illustrate various shapes of cap portions 1510*a* through 1510*f* of first removable end caps 1500*a* through 1500*f*, respectively, according to exemplary embodiments of the present general inventive concept. The various shapes are not limited to the first removable end caps 1500*a* through 1500*f*, and may be also applied to the second removable end cap 1600, or any other embodiments of aforementioned removable end caps.

Figure 12A:
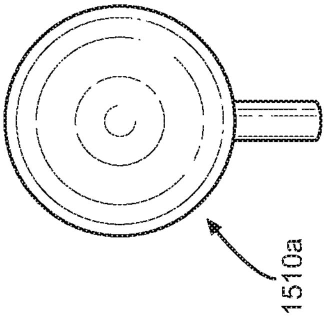
FIGS. 12A through 12F illustrate various shapes of cap portions of removable end caps, according to exemplary embodiments of the present general inventive concept.

Referring to FIG. 12A, the cap portion 1510*a* has a shape of a ball, but is not limited thereto.

Figure 12B:
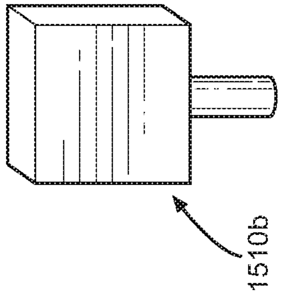

Referring to FIG. 12B, the cap portion 1510*b* has a shape of a square and/or cube, but is not limited thereto.

Figure 12C:
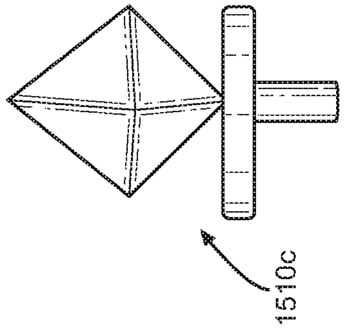

Referring to FIG. 12C, the cap portion 1510*c* has a shape of a diamond, but is not limited thereto.

Figure 12D:
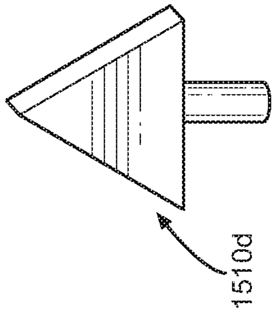

Referring to FIG. 12D, the cap portion 1510*d* has a shape of a triangle and/or pyramid, but is not limited thereto.

Figure 12E:
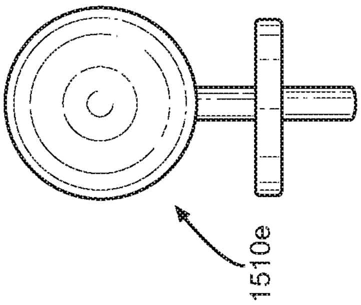

Referring to FIG. 12E, the cap portion 1510*e* has a shape of a medal, but is not limited thereto.

Figure 12F:
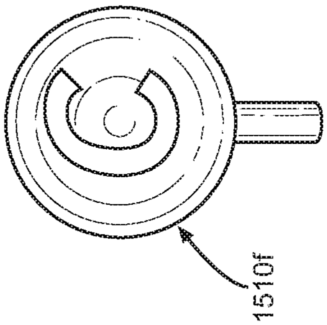

Referring to FIG. 12F, the cap portion 1510*f* has a shape of a copyright symbol, but is not limited thereto.

Although FIGS. 12A through 12F illustrate various shapes of the first removable end caps 1500*a* through 1500*f*, the first removable end caps 1500*a* through 1500*f* may also differ in size/color/material, and may also have any other type of shape desired by the user. Furthermore, the user may etch a desired logo, trademark, or slogan onto any portion of the end cap for further personalization.

Figure 13:
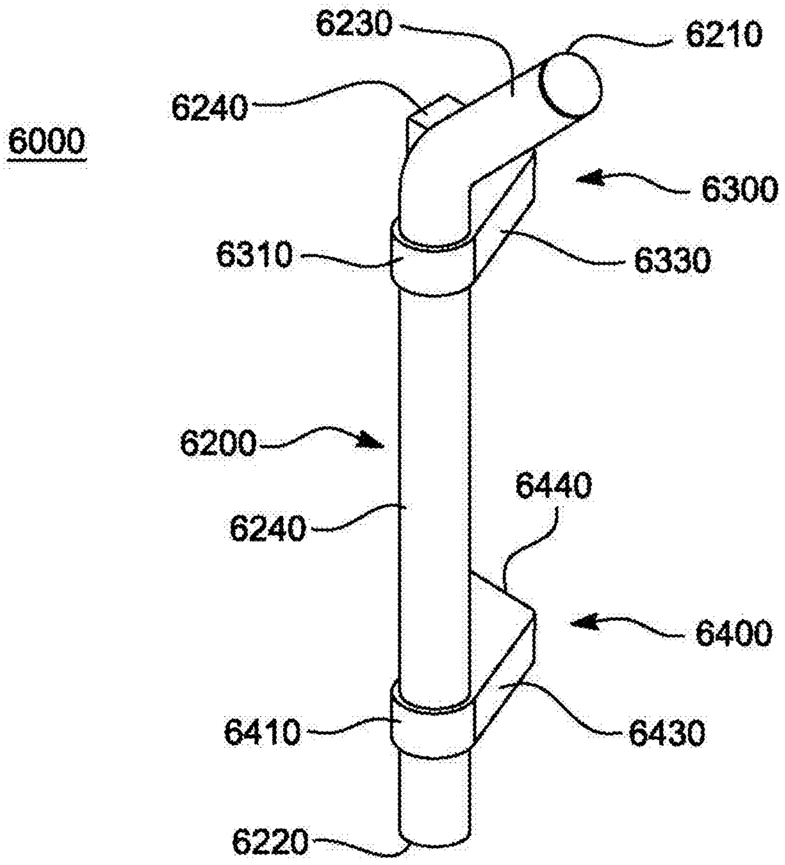
FIG. 13 illustrates an isometric view of an adjustable bent door pull, according to another exemplary embodiment of the present general inventive concept.

FIG. 13 illustrates an isometric view of an adjustable bent door pull 6000, according to another exemplary embodiment of the present general inventive concept.

Referring to FIG. 13, the adjustable door pull 6000 may include a bent grip 6200, a first detachable standoff 6300, and a second detachable standoff 1400, but is not limited thereto.

Figure 14B:
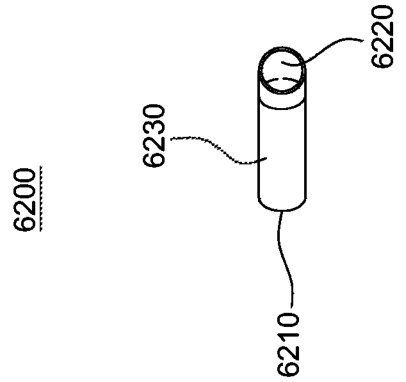
FIG. 14B illustrates an elevational bottom view of the bent grip, according to another exemplary embodiment of the present general inventive concept.
Figure 14A:
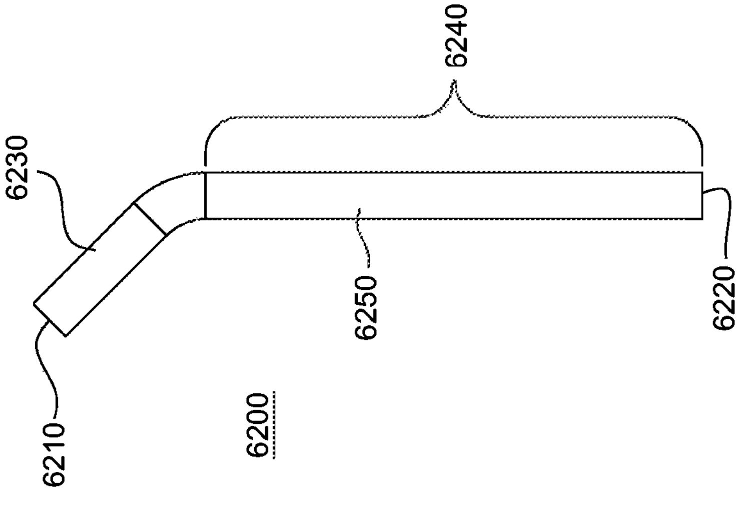
FIG. 14A illustrates an elevational right side view of a bent grip, according to another exemplary embodiment of the present general inventive concept.

FIG. 14A illustrates an elevational right side view of a bent grip 6200, according to another exemplary embodiment of the present general inventive concept.

FIG. 14B illustrates an elevational bottom view of the bent grip 6200, according to another exemplary embodiment of the present general inventive concept.

The bent grip 6200 (a.k.a., a handle 6200) may be provided to have various lengths, based on a user's preference. More specifically, the user may desire the bent grip 6200 to be anywhere between six inches long to ten feet long, based on a type of door the bent grip 6200 is designed to open, and may be even shorter or longer based on the user's preference. The bent grip 6200 may also be provided in various widths based on the user's preference. Finally, the bent grip 6200 may be provided in various shapes, including, but not limited to, cylindrical, triangular, square, hexagonal, and octagonal.

The bent grip 6200 may include a first end 6210, a second end 6220, a bent portion 6230, a main portion 6240, and a lateral surface 6250, but is not limited thereto.

The bent portion 6210 may be disposed at the first end 6210 of the bent grip 6200. The main portion 6240 may be disposed on the second end 6220 of the bend grip 6200. The bent grip 6200 may facilitate gripping thereof.

Moreover, the bent portion 6230 may be angularly disposed on at least a portion of the main portion 6240, such that the bent portion 6230 may extend away from the main portion 6240 with respect to a lateral direction.

As such, the bent portion 6230 may extend in an angular direction away from a door 100. As such, the bent portion 6230 may be used to open the door 100 without using hands, such as a forearm, an elbow, and/or a shoulder.

Figure 15B:
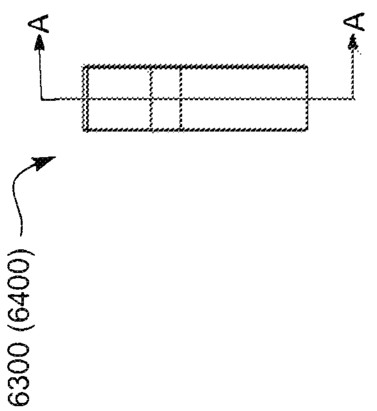
FIG. 15B illustrates an elevational top view of the first detachable standoff or the second detachable standoff, according to another exemplary embodiment of the present general inventive concept.
Figure 15A:
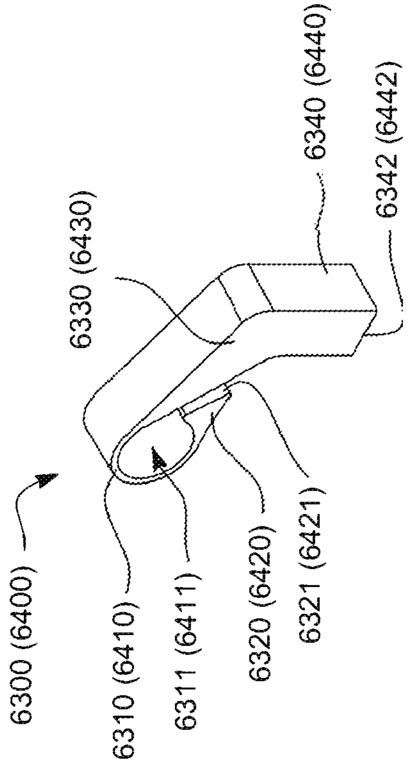
FIG. 15A illustrates a top perspective view of a first detachable standoff or a second detachable standoff, according to another exemplary embodiment of the present general inventive concept.

FIG. 15A illustrates a top perspective view of a first detachable standoff 6300 or a second detachable standoff 6400, according to another exemplary embodiment of the present general inventive concept.

FIG. 15B illustrates an elevational top view of the first detachable standoff 6300 or the second detachable standoff 6400, according to another exemplary embodiment of the present general inventive concept.

Figure 15C:
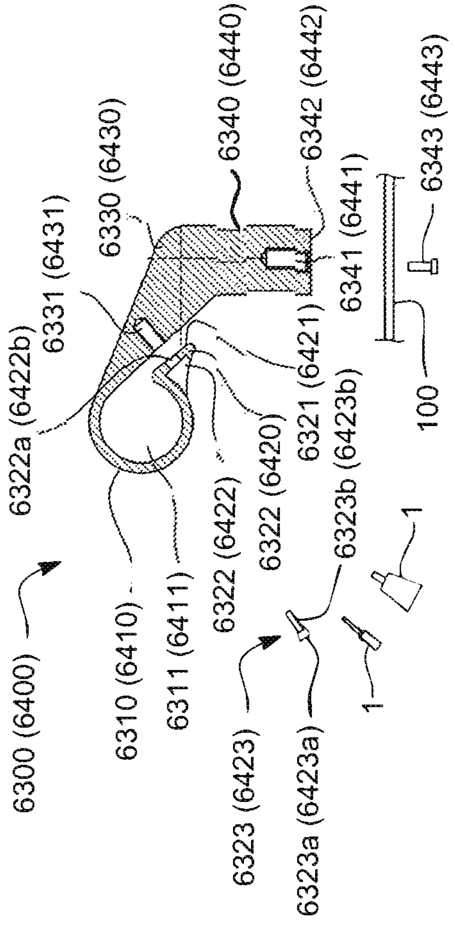
FIG. 15C illustrates a sectional view taken along A-A of FIG. 15B of the first detachable standoff or the second detachable standoff, according to another exemplary embodiment of the present general inventive concept.

FIG. 15C illustrates a sectional view taken along A-A of FIG. 15B of the first detachable standoff 6300 or the second detachable standoff 6400, according to another exemplary embodiment of the present general inventive concept.

Referring to FIGS. 15A through 15C, the first detachable standoff 6300 may include an attachment portion 6310, a clamp portion 6320, an offset portion 6330, and a leg 6340, but is not limited thereto.

The attachment portion 6310 may include an aperture 6311, which may be designed to correspond to a shape of the bent grip 6200, such that the bent grip 6200 may slide into and be disposed within at least one aperture 6311.

The clamp portion 6320 may include a clamp surface 6321, a clamp fastener head receiving aperture 6322, and a clamp fastener 6323, but is not limited thereto.

The clamp portion 6320 may be disposed on a first end of the attachment portion 6310. The offset portion 6330 may be disposed on a second end of the attachment portion 6310. In other words, the attachment portion 6310 may be disposed on a first end of the offset portion 6330.

The clamp fastener head receiving aperture 6322 may include a first clamp fastener receiving aperture 6322*a*, but is not limited thereto.

The clamp fastener 6323 may include a twine, a string, a rope, a magnet, a clasp, a hook, a screw, a nail, a bolt, a nut, a washer, and/or any combination thereof, but is not limited thereto.

The offset portion 6330 may include a second clamp fastener receiving aperture 6331, but is not limited thereto.

The clamp surface 6321 may be moved away from the offset portion 6330, such that the aperture 6311 may be expanded to facilitate insertion of the bent grip 6200 therein. In other words, the attachment portion 6311 may deform in response to movement of the clamp surface 6321 away from the offset portion 6330, such that the aperture 6311 may increase in size.

As such, the clamp portion 6320 may control movement of the bent grip 6200 therethrough. The clamp portion 6320 reduces movement of the bent grip 6200 in response to moving toward the offset portion 6330, and increases movement of the bent grip 6200 in response to moving away from the offset portion 6330.

Referring to FIG. 15C, the clamp fastener 6323 may include a fastener head 6323*a* and a fastener body 6323*b*, but is not limited thereto.

Furthermore, the clamp surface 6321 may contact at least a portion of the offset portion 6330. The second clamp fastener head receiving aperture 6331 may be disposed on at least a portion of the offset portion 6330. Moreover, the clamp fastener 6323 may be inserted into the clamp fastener head receiving aperture 6322. More specifically, at least a portion of the fastener body 6323*b* may be inserted into the first clamp fastener receiving aperture 6322*a* and at least a portion of the second clamp fastener receiving aperture 6331. Also, the clamp fastener head receiving aperture 6331 may receive the fastener head 6323*a* therein.

As such, the clamp fastener 6323 may be rotated to be tightened within the first clamp fastener receiving aperture 6322*a* and the second clamp fastener receiving aperture 6331 in a first direction, and extracted from the first clamp fastener receiving aperture 6322*a* and the second clamp fastener receiving aperture 6331 in a second direction, using the tool 1. As such, the clamp portion 6320 may move toward the offset portion 6330 in response to tightening the clamp fastener 6323, and move away from the offset portion 6330 in response to extracting the clamp fastener 6323.

As illustrated in FIGS. 13, 15A, and 15C, the leg 6340 (a.k.a., a protruding portion 6340) may be offset from the bent grip 6200 by the offset portion 6330. Specifically, the offset portion 6330 may extend away from the attachment portion 6310 and/or the bent grip 6200 a predetermined distance away from the leg 6340 and/or the door 100 in a first direction.

The leg 6340 may include a set screw receiving aperture 6341, an attachment surface 6342, and a set screw 6343, but is not limited thereto.

The leg 6340 may be disposed on a second end of the offset portion 6330. The leg 6340 may extend away from the offset portion 6330 in a second direction different from the first direction.

The set screw 6343 may include a twine, a string, a rope, a magnet, a clasp, a hook, a screw, a nail, a bolt, a nut, a washer, and/or any combination thereof, but is not limited thereto.

The set screw receiving aperture 6341 may be disposed on at least a portion of the attachment surface 6342. The attachment surface 6342 may be disposed on the first surface of the door 100. Additionally, the set screw 6343 may be inserted into the set screw receiving aperture 6341 through the second surface of the door 100, such that the first detachable standoff 6300 may be mounted on the first surface of the door 100. Also, the set screw 6343 may be rotated to be tightened within the set screw receiving aperture 6341 in a first direction and extracted from the set screw receiving aperture 6341 in a second direction, using the tool 1. Also, the adhesive 2 may be applied to the set screw 6343 prior to insertion within the set screw receiving aperture 6341 to prevent the set screw 6343 from being extracted from the set screw receiving aperture 6341.

Therefore, the first detachable standoff 6300 may provide flexibility to connect the bent grip 6200 to the door 100. Furthermore, the first detachable standoff 6300 may accommodate various shapes and/or sizes of the bent grip 6200 due to variability in the size of the aperture 6311.

The second detachable standoff 6400 may be constructed from at least one of metal, plastic, wood, and rubber, etc., but is not limited thereto.

Referring to FIGS. 15A through 15C, the second detachable standoff 6400 may include an attachment portion 6410, a clamp portion 6420, an offset portion 6430, and a leg 6440, but is not limited thereto.

The attachment portion 6410 may include an aperture 6411, which may be designed to correspond to a shape of the bent grip 6200, such that the bent grip 6200 may slide into and be disposed within at least one aperture 6411.

The clamp portion 6420 may include a clamp surface 6421, a clamp fastener head receiving aperture 6422, and a clamp fastener 6423, but is not limited thereto.

The clamp portion 6420 may be disposed on a first end of the attachment portion 6410. The offset portion 6430 may be disposed on a second end of the attachment portion 6410. In other words, the attachment portion 6410 may be disposed on a first end of the offset portion 6430.

The clamp fastener head receiving aperture 6422 may include a first clamp fastener receiving aperture 6422*a*, but is not limited thereto.

The clamp fastener 6423 may include a twine, a string, a rope, a magnet, a clasp, a hook, a screw, a nail, a bolt, a nut, a washer, and/or any combination thereof, but is not limited thereto.

The offset portion 6430 may include a second clamp fastener receiving aperture 6431, but is not limited thereto.

The clamp surface 6421 may be moved away from the offset portion 6430, such that the aperture 6411 may be expanded to facilitate insertion of the bent grip 6200 therein. In other words, the attachment portion 6411 may deform in response to movement of the clamp surface 6421 away from the offset portion 6430, such that the aperture 6411 may increase in size.

As such, the clamp portion 6420 may control movement of the bent grip 6200 therethrough. The clamp portion 6420 reduces movement of the bent grip 6200 in response to moving toward the offset portion 6430, and increases movement of the bent grip 6200 in response to moving away from the offset portion 6430.

Referring to FIG. 15C, the clamp fastener 6423 may include a fastener head 6423*a* and a fastener body 6423*b*, but is not limited thereto.

Furthermore, the clamp surface 6421 may contact at least a portion of the offset portion 6430. The second clamp fastener head receiving aperture 6431 may be disposed on at least a portion of the offset portion 6430. Moreover, the clamp fastener 6423 may be inserted into the clamp fastener head receiving aperture 6422. More specifically, at least a portion of the fastener body 6423*b* may be inserted into the first clamp fastener receiving aperture 6422*a* and at least a portion of the second clamp fastener receiving aperture 6431. Also, the clamp fastener head receiving aperture 6431 may receive the fastener head 6423*a* therein.

As such, the clamp fastener 6423 may be rotated to be tightened within the first clamp fastener receiving aperture 6422*a* and the second clamp fastener receiving aperture 6431 in a first direction, and extracted from the first clamp fastener receiving aperture 6422*a* and the second clamp fastener receiving aperture 6431 in a second direction, using the tool 1. As such, the clamp portion 6420 may move toward the offset portion 6430 in response to tightening the clamp fastener 6423, and move away from the offset portion 6430 in response to extracting the clamp fastener 6423.

As illustrated in FIGS. 13, 15A, and 15C, the leg 6440 (a.k.a., a protruding portion 6440) may be offset from the bent grip 6200 by the offset portion 6430. Specifically, the offset portion 6430 may extend away from the attachment portion 6410 and/or the bent grip 6200 a predetermined distance away from the leg 6440 and/or the door 100 in a first direction.

The leg 6440 may include a set screw receiving aperture 6441, an attachment surface 6442, and a set screw 6443, but is not limited thereto.

The leg 6440 may be disposed on a second end of the offset portion 6430. The leg 6440 may extend away from the offset portion 6430 in a second direction different from the first direction.

The set screw 6443 may include a twine, a string, a rope, a magnet, a clasp, a hook, a screw, a nail, a bolt, a nut, a washer, and/or any combination thereof, but is not limited thereto.

The set screw receiving aperture 6441 may be disposed on at least a portion of the attachment surface 6442. The attachment surface 6442 may be disposed on the first surface of the door 100. Additionally, the set screw 6443 may be inserted into the set screw receiving aperture 6441 through the second surface of the door 100, such that the second detachable standoff 6400 may be mounted on the first surface of the door 100. Also, the set screw 6443 may be rotated to be tightened within the set screw receiving aperture 6441 in a first direction and extracted from the set screw receiving aperture 6441 in a second direction, using the tool 1. Also, the adhesive 2 may be applied to the set screw 6443 prior to insertion within the set screw receiving aperture 6441 to prevent the set screw 6443 from being extracted from the set screw receiving aperture 6441.

Therefore, the second detachable standoff 6400 may provide flexibility to connect the bent grip 6200 to the door 100. Furthermore, the second detachable standoff 6400 may accommodate various shapes and/or sizes of the bent grip 6200 due to variability in the size of the aperture 6411.

Although two standoffs (i.e., the first detachable standoff 6300 and the second detachable standoff 6400) are illustrated in the embodiment of FIG. 13, as well as other embodiments, the present general inventive concept is not limited thereto, and a single standoff can be included, as well as three or more standoffs, based on a length of the bent grip 6200.

Figure 16A:
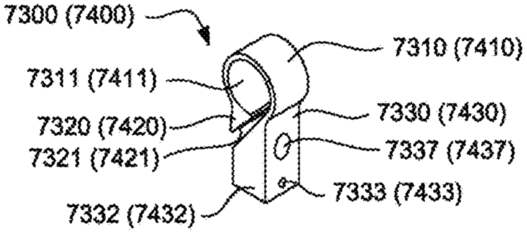
FIG. 16A illustrates a top perspective view of a first detachable standoff or a second detachable standoff, according to another exemplary embodiment of the present general inventive concept.

FIG. 16A illustrates a top perspective view of a first detachable standoff 7300 or a second detachable standoff 7400, according to another exemplary embodiment of the present general inventive concept.

Figure 16B:
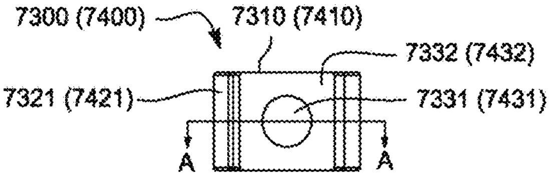
FIG. 16B illustrates an elevational bottom view of the first detachable standoff or the second detachable standoff, according to another exemplary embodiment of the present general inventive concept.

FIG. 16B illustrates an elevational bottom view of the first detachable standoff 7300 or the second detachable standoff 7400, according to another exemplary embodiment of the present general inventive concept.

Figure 16C:
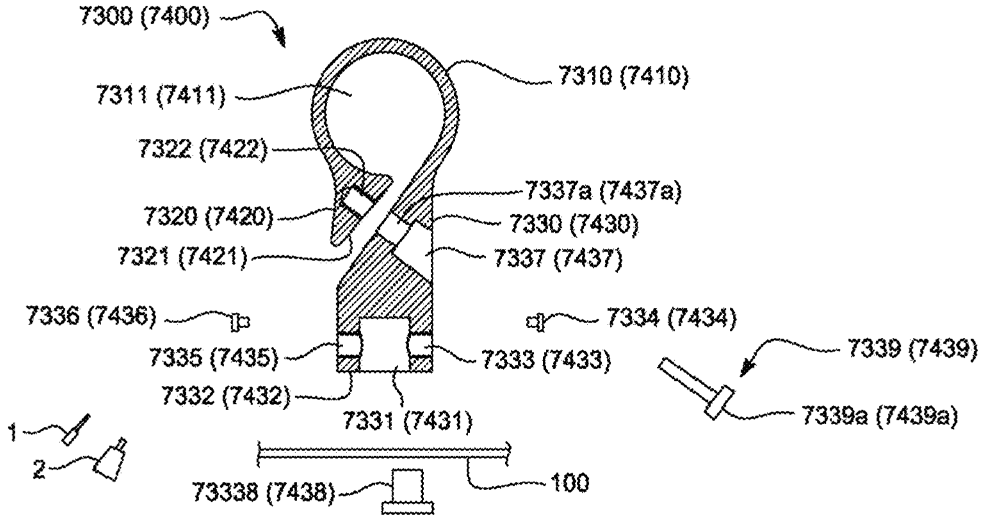
FIG. 16C illustrates a sectional view taken along A-A of FIG. 16B of the first detachable standoff or the second detachable standoff, according to another exemplary embodiment of the present general inventive concept.

FIG. 16C illustrates a sectional view taken along A-A of FIG. 16B of the first detachable standoff 7300 or the second detachable standoff 7400, according to another exemplary embodiment of the present general inventive concept.

Referring again to FIG. 13, the adjustable bent door pull 6000 is illustrated with the first detachable standoff 6300 and the second detachable standoff 6400 disposed on the bent grip 6200. However, the adjustable bent door pull 6000 may, alternatively, include the first detachable standoff 7300 and/or the second detachable standoff 7400 based the user's preference.

Referring to FIGS. 16A through 16C, the first detachable standoff 7300 may include an attachment portion 7310, a clamp portion 7320, and a leg 7330, but is not limited thereto.

Referring to FIG. 16A, the attachment portion 7310 may include an aperture 7311, which may be designed to correspond to a shape of the bent grip 6200, such that the bent grip 6200 may slide into and be disposed within at least one aperture 7311.

The clamp portion 7320 may include a clamp surface 7321 and a first clamp fastener receiving aperture 7322, but is not limited thereto.

The clamp portion 7320 may be disposed on a first end of the attachment portion 7310. The leg 7330 may be disposed on a second end of the attachment portion 7310.

The leg 7330 (a.k.a., a protruding portion 7330) may include a set screw receiving aperture 7331, an attachment surface 7332, a first auxiliary set screw receiving aperture 7333, a first auxiliary set screw 7334, a second auxiliary set screw receiving aperture 7335, a second auxiliary set screw 7336, a clamp fastener head receiving aperture 7337, a set screw 7338, and a clamp fastener 7339, but is not limited thereto.

The first auxiliary set screw 7334 may include a twine, a string, a rope, a magnet, a clasp, a hook, a screw, a nail, a bolt, a nut, a washer, and/or any combination thereof, but is not limited thereto.

The second auxiliary set screw 7336 may include a twine, a string, a rope, a magnet, a clasp, a hook, a screw, a nail, a bolt, a nut, a washer, and/or any combination thereof, but is not limited thereto.

The set screw 7338 may include a twine, a string, a rope, a magnet, a clasp, a hook, a screw, a nail, a bolt, a nut, a washer, and/or any combination thereof, but is not limited thereto.

The clamp fastener 7339 may include a twine, a string, a rope, a magnet, a clasp, a hook, a screw, a nail, a bolt, a nut, a washer, and/or any combination thereof, but is not limited thereto.

The set screw receiving aperture 7331 may be disposed on at least a portion of the attachment surface 7332. The attachment surface 7332 may be disposed on a first surface of a door 100. Additionally, the set screw 7338 may be inserted into the set screw receiving aperture 7331 through a second surface of the door 100, opposite with respect to the first surface, such that the first detachable standoff 7300 may be mounted on the first surface of the door 100. Also, the set screw 7338 may be rotated to be tightened within the set screw receiving aperture 7331 in a first direction and extracted from the set screw receiving aperture 7331 in a second direction, using a tool 1, such as a screwdriver or a wrench. Also, an adhesive 2 may be applied to the set screw 7338 prior to insertion within the set screw receiving aperture 7331 to prevent the set screw 7338 from being extracted from the set screw receiving aperture 7331.

The first auxiliary set screw receiving aperture 7333 may be perpendicularly disposed away from the set screw receiving aperture 7331 with respect to a first direction on at least a portion of a first side of the leg 7330. The second auxiliary set screw receiving aperture 7335 may be perpendicularly disposed away from the set screw receiving aperture 7331 with respect to a second direction on at least a portion of a second side of the leg 7330, opposite with respect to the first side of the leg 7330. The first auxiliary set screw receiving aperture 7333 may receive the first auxiliary set screw 7334, and the second auxiliary set screw receiving aperture 7335 may receive the second auxiliary set screw 7336. The first auxiliary set screw 7334 and/or the second auxiliary set screw 7336 may contact at least a portion of the set screw 7338. As such, the first auxiliary set screw 7334 and/or the second auxiliary set screw 7336 may prevent the set screw 7338 from being extracted from the set screw receiving aperture 7331.

The clamp surface 7321 may be moved away from the leg 7330, such that the aperture 7311 may be expanded to facilitate insertion of the bent grip 6200 therein. In other words, the attachment portion 7311 may deform in response to movement of the clamp surface 7321 away from the leg 7330, such that the aperture 7311 may increase in size.

As such, the clamp portion 7320 may control movement of the bent grip 6200 therethrough. The clamp portion 7320 reduces movement of the bent grip 6200 in response to moving toward the leg 7330, and increases movement of the bent grip 6200 in response to moving away from the leg 7330.

The clamp fastener head receiving aperture 7337 may include a second clamp fastener receiving aperture 7337*a*, but is not limited thereto.

The clamp fastener 7339 may include a fastener head 7339*a* and a fastener body 7339*b*, but is not limited thereto.

Furthermore, the clamp surface 7321 may contact at least a portion of the leg 7330. The clamp fastener head receiving aperture 7337 may be disposed on at least a portion of the first side of the leg 7330. Moreover, the clamp fastener 7339 may be inserted into the clamp fastener head receiving aperture 7337. More specifically, at least a portion of the fastener body 7339*b* may be inserted into the first clamp fastener receiving aperture 7322 and at least a portion of the second clamp fastener receiving aperture 7337*a*. Also, the clamp fastener head receiving aperture 7337 may receive the fastener head 7339*a* therein.

As such, the clamp fastener 7339 may be rotated to be tightened within the first clamp fastener receiving aperture 7322 and the second clamp fastener receiving aperture 7337*a* in a first direction, and extracted from the first clamp fastener receiving aperture 7322 and the second clamp fastener receiving aperture 7337*a* in a second direction, using the tool 1. As such, the clamp portion 7320 may move toward the leg 7330 in response to tightening the clamp fastener 7339, and move away from the leg 7330 in response to extracting the clamp fastener 7339.

Therefore, the first detachable standoff 7300 may provide flexibility to connect the bent grip 6200 to the door 100. Furthermore, the first detachable standoff 7300 may accommodate various shapes and/or sizes of the bent grip 6200 due to variability in the size of the aperture 7311.

Referring to FIGS. 16A through 16C, the second detachable standoff 7400 may include an attachment portion 7410, a clamp portion 7420, and a leg 7430, but is not limited thereto.

Referring to FIG. 16A, the attachment portion 7410 may include an aperture 7411, which may be designed to correspond to a shape of the bent grip 6200, such that the bent grip 6200 may slide into and be disposed within at least one aperture 7411.

The clamp portion 7420 may include a clamp surface 7421 and a first clamp fastener receiving aperture 7422, but is not limited thereto.

The clamp portion 7420 may be disposed on a first end of the attachment portion 7410. The leg 7430 may be disposed on a second end of the attachment portion 7410.

The leg 7430 (a.k.a., a protruding portion 7430) may include a set screw receiving aperture 7431, an attachment surface 7432, a first auxiliary set screw receiving aperture 7433, a first auxiliary set screw 7434, a second auxiliary set screw receiving aperture 7435, a second auxiliary set screw 7436, a clamp fastener head receiving aperture 7437, a set screw 7438, and a clamp fastener 7439, but is not limited thereto.

The first auxiliary set screw 7434 may include a twine, a string, a rope, a magnet, a clasp, a hook, a screw, a nail, a bolt, a nut, a washer, and/or any combination thereof, but is not limited thereto.

The second auxiliary set screw 7436 may include a twine, a string, a rope, a magnet, a clasp, a hook, a screw, a nail, a bolt, a nut, a washer, and/or any combination thereof, but is not limited thereto.

The set screw 7438 may include a twine, a string, a rope, a magnet, a clasp, a hook, a screw, a nail, a bolt, a nut, a washer, and/or any combination thereof, but is not limited thereto.

The clamp fastener 7439 may include a twine, a string, a rope, a magnet, a clasp, a hook, a screw, a nail, a bolt, a nut, a washer, and/or any combination thereof, but is not limited thereto.

The set screw receiving aperture 7431 may be disposed on at least a portion of the attachment surface 7432. The attachment surface 7432 may be disposed on a first surface of a door 100. Additionally, the set screw 7438 may be inserted into the set screw receiving aperture 7431 through a second surface of the door 100, opposite with respect to the first surface, such that the second detachable standoff 7400 may be mounted on the first surface of the door 100. Also, the set screw 7438 may be rotated to be tightened within the set screw receiving aperture 7431 in a first direction and extracted from the set screw receiving aperture 7431 in a second direction, using a tool 1, such as a screwdriver or a wrench. Also, an adhesive 2 may be applied to the set screw 7438 prior to insertion within the set screw receiving aperture 7431 to prevent the set screw 7438 from being extracted from the set screw receiving aperture 7431.

The first auxiliary set screw receiving aperture 7433 may be perpendicularly disposed away from the set screw receiving aperture 7431 with respect to a first direction on at least a portion of a first side of the leg 7430. The second auxiliary set screw receiving aperture 7435 may be perpendicularly disposed away from the set screw receiving aperture 7431 with respect to a second direction on at least a portion of a second side of the leg 7430, opposite with respect to the first side of the leg 7430. The first auxiliary set screw receiving aperture 7433 may receive the first auxiliary set screw 7434, and the second auxiliary set screw receiving aperture 7435 may receive the second auxiliary set screw 7436. The first auxiliary set screw 7434 and/or the second auxiliary set screw 7436 may contact at least a portion of the set screw 7438. As such, the first auxiliary set screw 7434 and/or the second auxiliary set screw 7436 may prevent the set screw 7438 from being extracted from the set screw receiving aperture 7431.

The clamp surface 7421 may be moved away from the leg 7430, such that the aperture 7411 may be expanded to facilitate insertion of the bent grip 6200 therein. In other words, the attachment portion 7411 may deform in response to movement of the clamp surface 7421 away from the leg 7430, such that the aperture 7411 may increase in size.

As such, the clamp portion 7420 may control movement of the bent grip 6200 therethrough. The clamp portion 7420 reduces movement of the bent grip 6200 in response to moving toward the leg 7430, and increases movement of the bent grip 6200 in response to moving away from the leg 7430.

The clamp fastener head receiving aperture 7437 may include a second clamp fastener receiving aperture 7337*a*, but is not limited thereto.

The clamp fastener 7439 may include a fastener head 7439*a* and a fastener body 7439*b*, but is not limited thereto.

Furthermore, the clamp surface 7421 may contact at least a portion of the leg 7430. The clamp fastener head receiving aperture 7437 may be disposed on at least a portion of the first side of the leg 7430. Moreover, the clamp fastener 7439 may be inserted into the clamp fastener head receiving aperture 7437. More specifically, at least a portion of the fastener body 7439*b* may be inserted into the first clamp fastener receiving aperture 7422 and at least a portion of the second clamp fastener receiving aperture 7337*a*. Also, the clamp fastener head receiving aperture 7437 may receive the fastener head 7439*a* therein.

As such, the clamp fastener 7439 may be rotated to be tightened within the first clamp fastener receiving aperture 7422 and the second clamp fastener receiving aperture 7337*a* in a first direction, and extracted from the first clamp fastener receiving aperture 7422 and the second clamp fastener receiving aperture 7337*a* in a second direction, using the tool 1. As such, the clamp portion 7420 may move toward the leg 7430 in response to tightening the clamp fastener 7439, and move away from the leg 7430 in response to extracting the clamp fastener 7439.

Therefore, the second detachable standoff 7400 may provide flexibility to connect the bent grip 6200 to the door 100. Furthermore, the second detachable standoff 7400 may accommodate various shapes and/or sizes of the bent grip 6200 due to variability in the size of the aperture 7411.

Although two standoffs (i.e., the first detachable standoff 7300 and the second detachable standoff 7400) are illustrated in the embodiment of FIG. 13, as well as other embodiments, the present general inventive concept is not limited thereto, and a single standoff can be included, as well as three or more standoffs, based on a length of the bent grip 6200.

The present general inventive concept may include an adjustable bent door pull 6000 to be installed on a first surface of a door 100, the adjustable bent door pull including a bent grip 6200 to facilitate gripping thereof, the bent grip 6200 including a main portion 6240, and a bent portion 6230 angularly disposed on at least a portion of the main portion 6240 to extend away from the main portion 6240 with respect to a lateral direction, and at least one detachable standoff 6300 removably connected to the bent grip 6200 to allow the bent grip 6200 to be attached to the first surface of the door 100, the at least one detachable standoff 6300 including an attachment portion 6310 comprising an aperture 6311 to receive the bent grip 6200 therein, a clamp portion 6320 disposed on a first end of the attachment portion 6310 to control movement of the bent grip 6200 through the aperture 6311, an offset portion 6330 disposed on a second end of the attachment portion 6310 to extend away from the attachment portion 6310 in a first direction, and a protruding portion 6340 to extend away from the offset portion 6330 in a second direction different from the first direction to connect to the first surface of the door 100.

The clamp portion 6320 may include a clamp surface 6321 to connect to the offset portion 6330, a clamp fastener head receiving aperture 6322 disposed within the clamp surface 6321, and a clamp fastener 6323 to be inserted into the clamp fastener head receiving aperture 6322 to move the clamp portion 6320 toward the protruding portion 6340 in response to tightening the clamp fastener 6323, and to move the clamp portion 6320 away from the protruding portion 6320 in response to extracting the clamp fastener 6323.

The clamp fastener head receiving aperture 6322 may include a first clamp fastener receiving aperture 6322*a* disposed within the clamp surface 6321.

The offset portion 6330 may include a second clamp fastener receiving aperture 6331 to receive at least a portion of the clamp fastener 6323 through the first clamp fastener receiving aperture 6322*a*.

The protruding portion 6340 may include a set screw receiving aperture 6341, and a set screw 6343 to be inserted through a second surface of the door 100 into the set screw receiving aperture 6341 to mount the protruding portion 6340 to the door 100.

The clamp portion 6320 may reduce movement of the bent grip 6200 in response to moving toward the protruding portion 6340, such that the aperture 6311 contracts in size.

The clamp portion 6320 may increase movement of the bent grip 6200 in response to moving away from the protruding portion 6340, such that the aperture 6311 expands in size.

The present general inventive concept may also include an adjustable bent door pull 6000 to be installed on a first surface of a door 100, the adjustable bent door pull 6000 including a bent grip 6200 to facilitate gripping thereof, the bent grip 6200 including a main portion 6240, and a bent portion 6230 angularly disposed on at least a portion of the main portion 6240 to extend away from the main portion 6240 with respect to a lateral direction, and at least one detachable standoff 7300 removably connected to the bent grip 6200 to allow the bent grip 6200 to be attached to the first surface of the door 100, the at least one detachable standoff 7300 including an attachment portion 7310 comprising an aperture 7311 to receive the bent grip 6200 therein, a clamp portion 7320 disposed on a first end of the attachment portion 7310 to control movement of the bent grip 6200 through the aperture 7311, and a protruding portion 7330 disposed on a second end of the attachment portion 7310 to connect to the first surface of the door 100.

The clamp portion 7320 may include a clamp surface 7321 to connect to the protruding portion 7330, and a first clamp fastener receiving aperture 7322 disposed within the clamp surface 7321.

The protruding portion 7330 may include a set screw receiving aperture 7331, a clamp fastener head receiving aperture 7337, a set screw 7338 to be inserted through a second surface of the door 100 into the set screw receiving aperture 7331 to mount the protruding portion 7330 to the door 100, and a clamp fastener 7339 to be inserted into the clamp fastener head receiving aperture 7337 to move the clamp portion 7320 toward the protruding portion 7320 in response to tightening the clamp fastener 7339, and to move the clamp portion 7320 away from the protruding portion 7330 in response to extracting the clamp fastener 7339.

The protruding portion 7330 may further include a first auxiliary set screw receiving aperture 7333 perpendicularly disposed away from the set screw receiving aperture 7331 with respect to a first direction, a second auxiliary set screw receiving aperture 7335 perpendicularly disposed away from the set screw receiving aperture 7331 with respect to a second direction, a first auxiliary set screw 7334 to be inserted into the first auxiliary set screw receiving aperture 7333 to contact at least a portion of the set screw 7338, and a second auxiliary set screw 7336 to be inserted into the second auxiliary set screw receiving aperture 7335 to contact at least another portion of the set screw 7338, such that the first auxiliary set screw 7334 and the second auxiliary set screw 7336 prevent the set screw 7338 from being extracted from the set screw receiving aperture 7331.

The clamp fastener head receiving aperture 7337 may include a second clamp fastener receiving aperture 7337*a* to receive at least a portion of the clamp fastener 7339 through the first clamp fastener receiving aperture 7322.

The clamp portion 7320 may reduce movement of the bent grip 6200 in response to moving toward the protruding portion 7330, such that the aperture 7311 contracts in size.

The clamp portion 7320 may increase movement of the bent grip 6200 in response to moving away from the protruding portion 7330, such that the aperture 7311 expands in size.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents. As such, any combinations of the above embodiments are possible.

The invention claimed is:

1. An adjustable bent door pull to be installed on a first surface of a door, the adjustable bent door pull comprising:

a bent grip to facilitate gripping thereof, the bent grip comprising:

a main portion, and a bent portion angularly disposed on at least a portion of the main portion to extend away from the main portion with respect to a lateral direction; and at least one detachable standoff removably connected to the bent grip to allow the bent grip to be attached to the first surface of the door, the at least one detachable standoff comprising:

an attachment portion comprising an aperture to receive the bent grip therein, a clamp portion disposed on a first end of the attachment portion to control movement of the bent grip through the aperture, an offset portion disposed on a second end of the attachment portion to extend away from the attachment portion in a first direction, such that the clamp portion is on a same plane as the offset portion in response to the clamp portion contacting the offset portion, and a protruding portion to extend away from the offset portion in a second direction different from the first direction to connect to the first surface of the door.

2. The adjustable bent door pull of claim 1, wherein the clamp portion comprises:

a clamp surface to connect to the offset portion;

a clamp fastener head receiving aperture disposed within the clamp surface; and a clamp fastener to be inserted into the clamp fastener head receiving aperture to move the clamp portion toward the protruding portion in response to tightening the clamp fastener, and to move the clamp portion away from the protruding portion in response to extracting the clamp fastener.

3. The adjustable bent door pull of claim 2, wherein the clamp fastener head receiving aperture comprises:

a first clamp fastener receiving aperture disposed within the clamp surface.

4. The adjustable bent door pull of claim 3, wherein the offset portion comprises:

a second clamp fastener receiving aperture to receive at least a portion of the clamp fastener through the first clamp fastener receiving aperture.

5. The adjustable bent door pull of claim 1, wherein the protruding portion comprises:

a set screw receiving aperture; and a set screw to be inserted through a second surface of the door into the set screw receiving aperture to mount the protruding portion to the door.

6. The adjustable bent door pull of claim 1, wherein the clamp portion reduces movement of the bent grip in response to moving toward the protruding portion, such that the aperture contracts in size.

7. The adjustable bent door pull of claim 1, wherein the clamp portion increases movement of the bent grip in response to moving away from the protruding portion, such that the aperture expands in size.

8. An adjustable bent door pull to be installed on a first surface of a door, the adjustable bent door pull comprising:

a bent grip to facilitate gripping thereof, the bent grip comprising:

a main portion, and a bent portion angularly disposed on at least a portion of the main portion to extend away from the main portion with respect to a lateral direction; and at least one detachable standoff removably connected to the bent grip to allow the bent grip to be attached to the first surface of the door, the at least one detachable standoff comprising:

an attachment portion comprising an aperture to receive the bent grip therein, a clamp portion disposed on a first end of the attachment portion to control movement of the bent grip through the aperture, and a protruding portion disposed on a second end of the attachment portion to connect to the first surface of the door, such that the clamp portion is on a same plane as the protruding portion in response to the clamp portion contacting the protruding portion.

9. The adjustable bent door pull of claim 8, wherein the clamp portion comprises:

a clamp surface to connect to the protruding portion; and a first clamp fastener receiving aperture disposed within the clamp surface.

10. The adjustable bent door pull of claim 9, wherein the protruding portion comprises:

a set screw receiving aperture;

a clamp fastener head receiving aperture;

a set screw to be inserted through a second surface of the door into the set screw receiving aperture to mount the protruding portion to the door; and a clamp fastener to be inserted into the clamp fastener head receiving aperture to move the clamp portion toward the protruding portion in response to tightening the clamp fastener, and to move the clamp portion away from the protruding portion in response to extracting the clamp fastener.

11. The adjustable bent door pull of claim 10, wherein the protruding portion further comprises:

a first auxiliary set screw receiving aperture perpendicularly disposed away from the set screw receiving aperture with respect to a first direction;

a second auxiliary set screw receiving aperture perpendicularly disposed away from the set screw receiving aperture with respect to a second direction;

a first auxiliary set screw to be inserted into the first auxiliary set screw receiving aperture to contact at least a portion of the set screw; and a second auxiliary set screw to be inserted into the second auxiliary set screw receiving aperture to contact at least another portion of the set screw, such that the first auxiliary set screw and the second auxiliary set screw prevent the set screw from being extracted from the set screw receiving aperture.

12. The adjustable bent door pull of claim 10, wherein the clamp fastener head receiving aperture comprises:

a second clamp fastener receiving aperture to receive at least a portion of the clamp fastener through the first clamp fastener receiving aperture.

13. The adjustable bent door pull of claim 8, wherein the clamp portion reduces movement of the bent grip in response to moving toward the protruding portion, such that the aperture contracts in size.

14. The adjustable bent door pull of claim 8, wherein the clamp portion increases movement of the bent grip in response to moving away from the protruding portion, such that the aperture expands in size.

* * * * *